(12) United States Patent
Stone et al.

(10) Patent No.: US 8,781,925 B1
(45) Date of Patent: *Jul. 15, 2014

(54) ACCOUNTS PAYABLE PROCESS

(71) Applicant: The PNC Financial Services Group, Inc., Pittsburgh, PA (US)

(72) Inventors: James S. Stone, Wexford, PA (US); Greg Domaracki, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/836,667

(22) Filed: Mar. 15, 2013

Related U.S. Application Data

(60) Continuation of application No. 12/850,018, filed on Aug. 4, 2010, now Pat. No. 8,429,037, which is a continuation of application No. 11/710,890, filed on Feb. 26, 2007, now Pat. No. 7,865,411, which is a division of application No. 10/242,216, filed on Sep. 12, 2002, now abandoned.

(60) Provisional application No. 60/379,848, filed on May 13, 2002.

(51) Int. Cl.
*G07B 17/00* (2006.01)

(52) U.S. Cl.
USPC ........... 705/30; 705/28; 705/34; 705/35; 705/44; 705/40; 705/1; 705/80; 705/52

(58) Field of Classification Search
USPC .......... 705/30, 28, 29, 26, 34, 44, 45, 37, 40, 705/52
See application file for complete search history.

(56) References Cited

U.S. PATENT DOCUMENTS

| | | | |
|---|---|---|---|
| 5,694,551 | A | 12/1997 | Doyle et al. |
| 5,761,442 | A | 6/1998 | Barr et al. |
| 5,893,080 | A | 4/1999 | McGurl et al. |
| 5,943,656 | A | 8/1999 | Crooks et al. |
| 5,956,690 | A | 9/1999 | Haggerson et al. |
| 5,956,700 | A | 9/1999 | Landry |
| 5,963,925 | A | 10/1999 | Kolling et al. |
| 6,052,671 | A | 4/2000 | Crooks et al. |
| 6,058,380 | A | 5/2000 | Anderson et al. |
| 6,070,798 | A | 6/2000 | Nethery |
| 6,088,688 | A | 7/2000 | Crooks et al. |
| 6,098,053 | A | 8/2000 | Slater |

(Continued)

OTHER PUBLICATIONS

Cover, T.M., & Hart, P.E., Nearest Neighbor Pattern Classification, IEEE Transactions on Information Theory, vol. IT-13, No. 1 (Jan. 1967).

(Continued)

*Primary Examiner* — Vanel Frenel
(74) *Attorney, Agent, or Firm* — Buchanan Ingersoll & Rooney PC; Robert J. Pugh

(57) ABSTRACT

Techniques for performing an accounts payable process may include receiving transaction data including at least one of invoice data, purchase order data, and vendor data; and verifying a transaction by matching a dynamic data set of client-specified multi-dimensional criteria to the transaction data. An accounts payable system may include a host system in communication with one or more client systems. The host system may include a matching database configured to receive an accounts payable file including at least one of invoice data, purchase order data, and vendor data; and verify a transaction by matching a dynamic data set of client-specified multi-dimensional records to attributes of the accounts payable file.

17 Claims, 18 Drawing Sheets

(56) References Cited

U.S. PATENT DOCUMENTS

| | | | |
|---|---|---|---|
| 6,128,603 | A | 10/2000 | Dent et al. |
| 6,223,168 | B1 | 4/2001 | McGurl et al. |
| 6,282,552 | B1 | 8/2001 | Thompson et al. |
| 6,289,322 | B1 | 9/2001 | Kitchen et al. |
| 6,289,382 | B1 | 9/2001 | Bowman-Amuah |
| 6,292,789 | B1 | 9/2001 | Schutzer |
| 6,298,335 | B1 | 10/2001 | Bernstein |
| 6,304,857 | B1 | 10/2001 | Heindel et al. |
| 6,321,205 | B1 | 11/2001 | Eder |
| 6,330,555 | B1 | 12/2001 | Weber |
| 6,339,766 | B1 | 1/2002 | Gephart |
| 6,360,211 | B1 | 3/2002 | Anderson et al. |
| 6,363,362 | B1 | 3/2002 | Burfield et al. |
| 6,385,595 | B1 | 5/2002 | Kolling et al. |
| 6,397,198 | B1 | 5/2002 | Hoffman et al. |
| 6,430,562 | B1 | 8/2002 | Kardos et al. |
| 6,473,740 | B2 | 10/2002 | Cockrill et al. |
| 6,507,826 | B1 | 1/2003 | Maners |
| 6,629,081 | B1 | 9/2003 | Cornelius et al. |
| 6,668,397 | B2 | 12/2003 | Olenick et al. |
| 6,738,975 | B1 | 5/2004 | Yee et al. |
| 6,868,397 | B1 | 3/2005 | McCaslin |
| 6,882,966 | B2 | 4/2005 | Ryu et al. |
| 6,882,986 | B1 | 4/2005 | Heinemann et al. |
| 6,941,363 | B2 | 9/2005 | Ito et al. |
| 7,085,775 | B2 | 8/2006 | Short, III et al. |
| 7,167,844 | B1 | 1/2007 | Leong et al. |
| 7,180,883 | B2 | 2/2007 | Isokangas et al. |
| 7,269,574 | B2 | 9/2007 | Izuna et al. |
| 7,283,976 | B2 | 10/2007 | Aber et al. |
| 7,406,443 | B1 | 7/2008 | Fink et al. |
| 7,437,304 | B2 | 10/2008 | Barnard et al. |
| 7,865,411 | B2 | 1/2011 | Stone et al. |
| 2002/0099653 | A1 | 7/2002 | De Souza et al. |
| 2002/0198798 | A1 | 12/2002 | Ludwig et al. |
| 2003/0212617 | A1 | 11/2003 | Stone et al. |
| 2007/0271160 | A1 | 11/2007 | Stone et al. |

OTHER PUBLICATIONS

Infometrix Inc., Description of Pirouette Algorithms, Chemometrics Technical Note (1993).

Roussopoulos N., Kelley S. & Vincent F., Nearest Neighbor Queries, Proc. ACM SIGMOD Int. Conf. on Management of Data, pp. 71-79 (1995).

Berchtold S., Bohm C., Keim D. & Kriegel H.-P., A Cost Model for Nearest Neighbor Search in High Dimensional Data Space, Proc. 16th ACM SIGACT-SIGMOD-SIGART Symp. on Principles on Database Systems, pp. 78-86 (1997).

Bohm C., Braunmuller, B. & Kreigel H.-P., The Pruning Power: Theory and Heuristics for Mining Databases with Multiple k-Nearest-Neighbor Queries, Proc. Int. Conf. on Data Warehousing and Knowledge Discovery (2000).

Dynamix Technologies, Home: Products. Available at http://www.dynamixtechnologies.com/products/index.html (accessed May 10, 2002).

Luo Si, Nearest Neighbor Classification (Oct. 2001). Available at http://www.cs.cmu.edu/about.Isi (accessed Mar. 18, 2003).

Qu, J., An Introduction to Data Mining Technology, CSCI 6900 (Feb. 2002).

Winkler, W.E., Machine Learning, Information Retrieval, and Record Linkage. Available at http://www.niss.org/affiliates/dgworkshop/papers/winkler.pdf (last modified Nov. 2000).

Salton, G. & McGill, M.J., Introduction to Modern Information Retrieval, Chapter 5, Retrieval Evaluation (1983).

Mitchell, T.M., Machine Learning, Chapter 8, Instance-Based Learning, pp. 230-248 (1997).

Bottom Line Technologies, Products SmARt Cash Overview. Available at http://www.bottomline.com (2001).

Bottom Line Technologies, Products & Services SmARt Cash Overview. Available at http://www.bottomline.com (2002).

Bottom Line Technologies, Products SmARt Cash. Available at http://www.bottomline.com (2001).

Letter from Mr. Raymond Balestra of GPU Energy to Mr. George Siefert of PNC Bank, N.A., dated Nov. 6, 2001 and attached flowchart.

Jeff Stimpson, "Explosion of E-Accounting," Practical Accountant, vol. 34, No. 1, p. 20, Jan. 2001, printed from http://toolkit.dialog.com/intranet/cgi/present?STYL...ENT=DB=148,AN=13178-849,FM=9,Search=MD., Internet site, accessed on Dec. 30, 2009, 7 pages.

Office Action issued Feb. 8, 2007 for U.S. Appl. No. 10/242,216.

Office Action dated Jul. 2, 2008 for U.S. Appl. No. 11/835,793, filed Aug. 8, 2007.

Office Action dated Nov. 21, 2008 for U.S. Appl. No. 11/835,793, filed Aug. 8, 2007.

Office Action dated Apr. 29, 2009 for U.S. Appl. No. 11/835,793, filed Aug. 8, 2007.

Office Action dated Feb. 2, 2010 for U.S. Appl. No. 11/835,793, filed Aug. 8, 2007.

Newman, Carolyn. Find fraud using data analysis software. Jun. 12, 2000. Accounting Today, vol. 14, No. 10, p. 13.

PNCBANK
The Thinking Behind The Money.

John Doe, Acme Corporation (Logout)

| Vendor | Invoice List | | | | |
|---|---|---|---|---|---|
| Invoice matching | Unmatched – Invoices Not Matched to Purchase Orders | | | | |
| Auto-Matched | Approval Process Status | | | | |
| Assigned | ☐ Pending | ☑ Approved | | ☒ Rejected | |
| Assumed | | | | | |
| Unmatched | Select Column Heading to Sort | | | | |
| Approval Process | Purchase Order | Matched Invoice | Vendor Name | Amount | Items |
| Approved | ☐ 8529633210 | Find Match | Calent | $111.36 | Generator |
| Pending | ☐ 9836741230 | Find Match | Grainger | $126.98 | Pump |
| Rejected | ☐ 7193654280 | Find Match | General Electric | $21.06 | Ballast |
| Payments | ☐ 6439781233 | Find Match | Advanced Fluid Power | $15.26 | Controller |
| Unscheduled | ☐ 8264951735 | Find Match | Andersen | $65.25 | Cleaning Supplies |
| Pending | ☐ 9512368747 | Find Match | Alcoa | $103.62 | Electric Supplies |
| Past Due | ☐ 9965106741 | Find Match | Applied Power | $109.62 | Hardware |
| Rejected | ☐ 9911773350 | Find Match | Barnes Group | $65.21 | Pump |

FIG. 12

PNCBANK
The Thinking Behind The Money.
John Doe, Acme Corporation (Logout)

Invoice/Purchase Order Matching

| Vendor | Purchase Order To Match | P.O. Date | Vendor | Item | Qty | Amount |
|---|---|---|---|---|---|---|
| Invoice matching | 985674l230 | 12-Dec-01 | Grainger | Pump | 1 | $126.98 |
| Auto-Matched | | | | | | |
| Assigned | | | | | | |
| Assumed | | | | | | |
| Unmatched | | | | | | |

Possible Invoice Matches
Select Scanned Image to View In Window Below 1234567890    9876543210    9632587410    1593578426    9874561204

Aboroval Process
- Approved
- Pending
- Rejected

Selected Invoice: 1234567890

Page Navigation ▲▼ ◀▶    Rotate Image 90° 90°    Select Invoice as Match  Zoom🔍

0000  0000  0000  0000  0000
0000  0000  0000  0000  0000

SAMPLE INVOICE

0000  0000  0000  0000  0000

Payments
- Unscheduled
- Pending
- Past Due
- Rejected

Revenue
Electronic Commerce
Software
Investment Services
Total Revenue
Processing & Servicing Cancel

PNCBANK — The Thinking Behind The Money.
John Doe, Acme Corporation (Logout)

Invoice List

| Vendor | |
|---|---|
| Invoice matching | Assigned – Invoices Matched to Purchases Orders Manually |
| Auto-Matched | Approval Process Status |
| Assigned | ☐ Pending   ☑ Approved   ☒ Rejected |
| Assumed | |
| Unmatched | Select Column Heading to Sort |

| Approval Process | | Purchase Order | Matched Invoice | Vendor Name | Amount | Matched Invoice Assigned By | Payment Scheduled |
|---|---|---|---|---|---|---|---|
| Approved Pending Rejected | ☐ | 8529633210 | 9853600715 | Calent | $111.36 | Dorsey, K. | N/A |
| | ☒ | 3678904321 | 9000212322 | Grainger | $3698.22 | Crouch, E. | 01-Dec-01 |
| | ☐ | 7193654280 | 8934568888 | General Electric | $21.06 | Grossman, R. | N/A |
| Unscheduled Pending Past Due Rejected | ☐ | 6439781233 | 9875632512 | Advanced Fluid Power | $15.26 | Harrington, J. | N/A |
| Payments | ☐ | 8264951733 | 0364980048 | John Deere | $65.25 | Randle El A. | N/A |
| | ☒ | 9512368747 | 1810045015 | Alcoa | $103.62 | Williams, R. | Schedule |
| | ☐ | 1123987401 | 4441014487 | Applied Power | $109.62 | Peppers, J. | N/A |
| | ☒ | 9911773350 | 3683474321 | Barnes Group | $65.21 | Kitner, K. | N/A |

ACCOUNTS PAYABLE PROCESS

This application claims the priority benefit of U.S. Provisional Application No. 60/379,848 filed on May 13, 2002.

TECHNICAL FIELD

The present invention relates generally to an accounts payable process and more particularly to systems and techniques for automatically matching client specific vendor or purchase order information against invoices received from the client's vendors. Aspects of the present invention include a database that is designed to warehouse a client's vendor profiles and purchase order information and technologies that conduct multi-dimensional matching within specific parameters.

BACKGROUND

Accounts Payable (A/P) is a process employed by virtually every business in America. In its simplest form, A/P is the creation and distribution of a payment to settle an obligation (typically represented by an invoice) and the associated accounting entries to recognize the expense. While in small businesses A/P might be handled by an accountant or bookkeeper with ledgers or spreadsheets, A/P in larger businesses has evolved into a highly specialized application involving Enterprise Resource Planning (ERP) systems that link together previously disparate systems like Purchasing, Inventory, General Ledger (G/L), and Accounts Payable into a single, integrated system.

Using a manufacturing company as an example, Purchasing acquires the materials necessary to maintain targeted inventory levels in support the manufacturing process. To document the purchase, establish the exact nature of the items desired and their respective quantities, set prices, etc., a Purchase Order (P.O.) is created by the Buyer and is sent to the Seller either electronically or on paper. The Seller fills the order, completely or partially (in accordance with the requirements of the P.O.) and delivers the material(s) to the Buyer's designated location. Once received by the Buyer, the material is recorded in an inventory control system. The Seller, meanwhile, prepares and delivers to the Buyer an invoice that represents the amount due and payable in exchange for the materials provided. The Accounts Payable department of the Buyer compares the invoice to the original P.O. to ensure the purchase was properly authorized and to confirm that the terms on the invoice are consistent with those documented in the P.O. The A/P department also confirms through the inventory control process that the materials represented by the invoice have been received in a satisfactory condition.

If the invoice, P.O. and materials receipt records all match (a "three-way match"), payment can be remitted to the Seller. In the event that there are discrepancies in the match process (e.g., quantities or prices do not match, incorrect pricing, sales tax applied inappropriately, freight charges assessed, over shipment/billing, materials are unauthorized, items are billed but not received, etc.), the A/P department is responsible for researching and resolving the discrepancy.

Finally, the A/P department must classify each item on the invoice into its appropriate expense category for G/L posting. For example, in most businesses the costs for the inventory itself, the associated transportation/shipping charges, and any applicable sales taxes are recorded in different G/L categories even though they may all appear on a single invoice. This process exists in some form in virtually all businesses. In large businesses, it is automated significantly through specialized software or an integrated ERP system.

There are a number of challenges associated with managing the A/P process. Most notable, however, is the preponderance of paper that dominates the invoicing process. According to the Tower Group, there are some 14.5 billion business-to-business (B2B) invoices generated annually, and more than 95% of those are paper-based. Paper invoices are expensive according to the Institute of Management and Administration (IOMA), costing between $7 and $12 per item to administer through Accounts Payable. Taken together, these figures indicate a process that costs American businesses somewhere between $100 billion and $175 billion per year.

For most businesses, handling of paper invoices introduces accounts payable process costs in the following areas: mail receipt, invoice extraction and internal distribution; data entry of invoice information required for accurate G/L posting; and invoice retention.

Businesses have tried to address this challenge in several ways. Enterprise Resource Planning (ERP) systems can be very effective in linking together disparate systems (i.e. Purchasing, Receiving/Inventory, General Ledger) to facilitate the required 3 way match process (PO to invoice to receipt status). However, ERP systems do little to minimize the occurrence of paper invoices received within an A/P operation. Furthermore, the 3 way match process within the ERP environment occurs after all data has been entered into the system and is entirely dependent upon the quality of that data. Insufficient or inaccurate data will result in a flawed matching process and minimize the transactions that can be matched in an exact way. As a result, users very often resort to labor-intensive and costly manual intervention and queries to resolve data discrepancies and validate the match process.

Electronic Data Interchange (EDI) has enabled many companies to work with their trading partners to transfer purchase order and invoice information in an electronic format. While this process completely eliminates the traditional paper flow, adoption of EDI can be an expensive undertaking requiring integration resources and mutual (i.e. buyer and seller) acceptance of the required data formats. To date, market penetration of EDI data transfer is still low and prevalent in mostly large corporate trading relationships. Some businesses have resorted to imaging invoices upon arrival. While this solution does not mitigate the mail handling or data entry expenses, it does offer some improvement in internal distribution and storage. Other companies have chosen to outsource A/P processing altogether. In so doing, they can move the A/P process to a less expensive location with less expensive labor, but the process remains largely unchanged.

Electronic Invoice Presentment and Payment (EIPP) is, as its name suggests, targeted specifically at automating the processes of invoice delivery, review, approval, dispute resolution and payment generation from the Biller's perspective. However, EIPP has thus far been ineffective in addressing concerns of the accounts payable manager for a variety of reasons. Because most EIPP solutions are biller-centric, they have relatively limited built-in functionality for the A/P manager. More importantly, EIPP has not penetrated the invoice market because it represents a significant behavioral and/or systematic change for both the Buyer and the Seller. Even the best solutions, if not embraced by the majority of the potential users, will struggle to overcome the additional burden of being a processing "exception" in a world that favors standardization and consistency.

Finally, some companies have chosen to convert paper invoices to electronic transactions by data entering them prior to their introduction into the A/P process. While promising, this solution has several drawbacks. There is no known, reliable method to validate the data entry that is being done outside of the A/P process other than a manual, key verification process. Key verification, or duplicate keying, doubles the number of keystrokes required and significantly slows data entry while increasing costs. Given the large number of keystrokes required to convert a paper invoice into an electronic one with sufficient detail to allow G/L posting, key entry has generally proven to be impractical.

What is needed is a reliable, cost-effective method of converting the information contained in a wide variety of paper invoices into a uniform electronic format with sufficient detail to enable A/P processing and facilitate the three-way match.

SUMMARY

Aspects of the present invention provide a method for the conversion of paper invoices into electronic transactions that minimize the data entry required from an invoice by matching it with existing electronic data from the Purchase Order and other related files. Once matched, the data from these sources can be integrated into a uniform format and delivered electronically to the Accounts Payable department. This approach limits the amount of data entry required from the paper invoice and improves the integrity of the data conversion process by validating that data against previously approved Purchase Order information. Because the data has been validated, discrepancies in the match process will be minimized or eliminated. The solution preferably employees multi-dimensional matching technology that identifies complete matches as well as near matches that facilitates the integration of P.O. and invoice data into a single file.

In one general aspect, an accounts payable process includes receiving transaction data including at least one of invoice data, purchase order data, and vendor data; and verifying a transaction by matching a dynamic data set of client-specified multi-dimensional criteria to the transaction data.

Implementations may include one or more of the following features. For example, the dynamic data set may include client-specified purchase order information, vendor profile information and/or invoice information. The purchase order data may include: PO Number, Vendor Number, Vendor Name, Vendor Remit Address, PO Total Amount, PO Line Item Amount, Discount Percent, Discount Days, Invoice Number, Invoice Date, and/or Invoice Total Amount. The vendor data may include: Customer Number, Vendor Name, Vendor Remit Address, Vendor Number, Contact Name, E-mail Address, Payment Terms, and/or Vendor Status. The invoice data may include: PO Number, PO Line Item Quantity, PO Line Item Amount, Vendor Number, Vendor Address, Invoice Number, Invoice Date, Invoice Total Amount, Discount Percent, and Discount Days.

Implementations may involve identifying a set of probable matches based on client-specified criteria. The client-specified criteria may include a plurality of weighted factors and/or a tolerance range from an exact match. In one embodiment, probable matches and the transaction data may be simultaneously presented on a graphical user interface. In some cases, the graphical user interface may include a split screen for displaying probable matches and the transaction data. Implementations also may include automatically correcting discrepancies between the transaction data and client-specified information included in the dynamic data set and/or augmenting the transaction data with client-specified information included in the dynamic data set. In some cases, payment processing may be initiated for a verified transaction.

Matching may include performing a vendor matching process, a purchase order matching process, and/or an invoice matching process. The vendor matching process may involve comparing transaction data associated with a vendor to a client-specified vendor profile. The vendor profile may be a master vendor profile containing information regarding a plurality of vendors. The vendor matching process may include performing a preliminary vendor match and, if unsuccessful, identifying a set of probable vendor matches.

The purchase order matching process may involve comparing transaction data associated with a purchase order to a client-specified purchase order file. The purchase order file may include a digital image of a purchase order. The purchase order matching process may include performing a preliminary purchase order match and, if unsuccessful, identifying a set of probable purchase order matches.

The invoice matching process may involve comparing transaction data associated with an invoice to a client-specified invoice file. The invoice file may include a master invoice file containing information regarding a plurality of invoices. The invoice matching process may include performing a preliminary invoice match and, if unsuccessful, identifying a set of probable invoice matches.

Implementations also may include receiving an invoice associated with the transaction in paper form and/or electronic form, generating a digital image of an invoice received in paper form, and/or automatically extracting invoice data from the received invoice.

In another general aspect, an accounts payable system includes a host system in communication with one or more client systems. The host system may include a matching database configured to receive an accounts payable file including at least one of invoice data, purchase order data, and vendor data; and verify a transaction by matching a dynamic data set of client-specified multi-dimensional records to attributes of the accounts payable file.

Implementations may include one or more of the following features. For example, the host system may be accessible by a client system across a network such as, a wireless communications network, the Internet, and/or the World Wide Web. The matching database may store client-specified records including purchase order files, vendor profiles, and/or invoice files associated with a particular customer. The matching database may be configured to perform matching according to client-specific matching rules. The matching database may communicate probable matches to at least one client system and allow the client system to manually select at least one probable match. The AP system also may include a data transmission input device configured to communicate transaction information to the matching database, an unmatched processor configured to receive accounts payable files that are not matched to a client-specified record, and/or a matched file processor configured to receive and process accounts payable files that are matched to a client-specified record.

Aspects of the present invention may be implemented by an apparatus and/or by a computer program stored on a computer readable medium. The computer readable medium may include a disk, a device, and/or a propagated signal.

Other features and advantages will be apparent from the following description, including the drawings, and from the claims.

DESCRIPTION OF THE DRAWINGS

FIGS. 10-18 illustrate one embodiment of graphical user interfaces according to aspects of the present invention.

DETAILED DESCRIPTION

Figure 1:
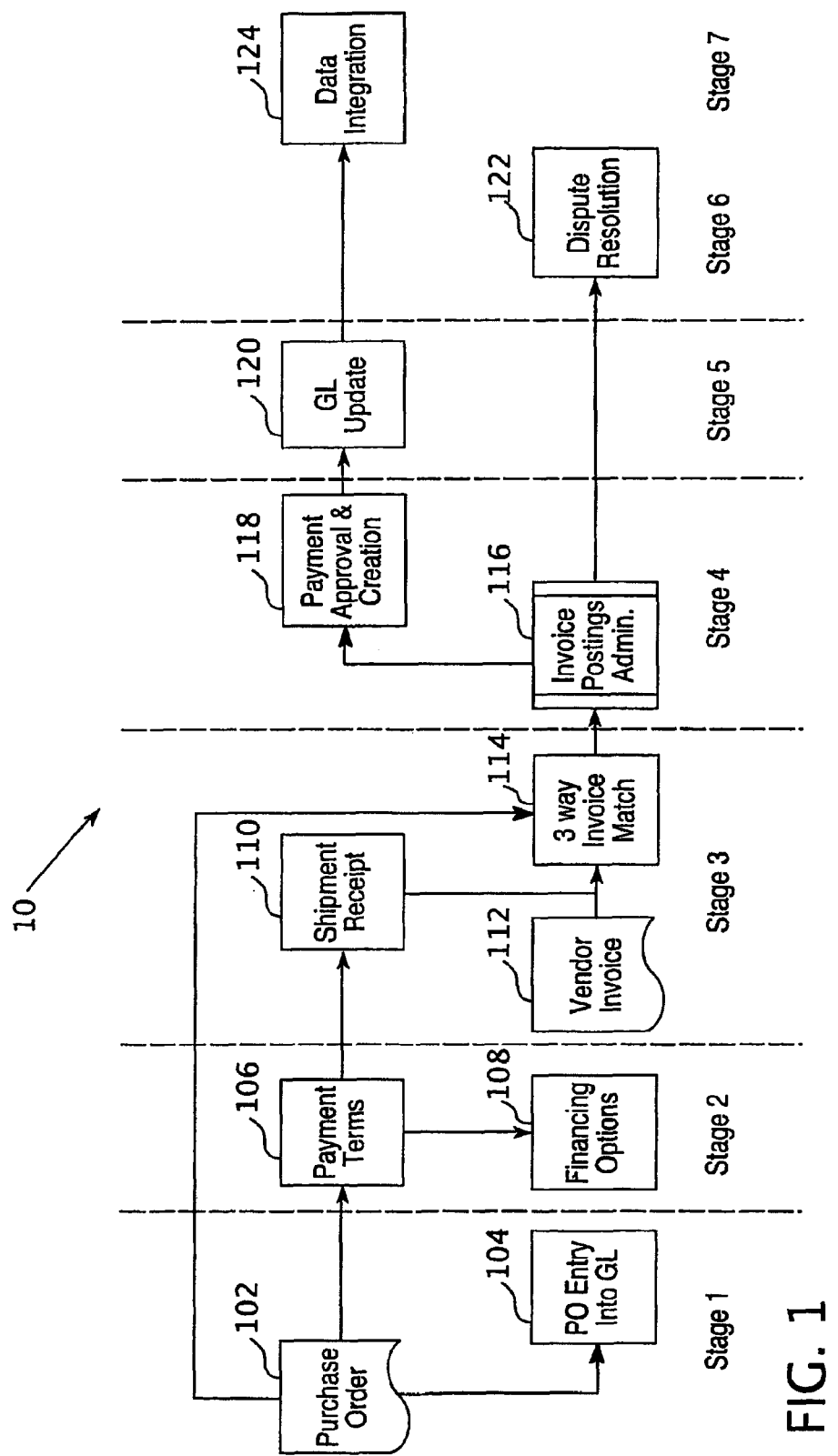
FIG. 1 illustrates one embodiment of an AP process according to aspects of the present invention.

FIG. 1 illustrates one example of an AP process 10. The AP process 10 has been divided into seven stages, i.e. Stage 1-Stage 7. Each stage includes one or more steps represented by labeled boxes. Movement from left to right represents the progression of the cycle. The vertical space between the steps represents time. Therefore, the more efficient the process becomes, the smaller the vertical space between the steps.

Stage 1 involves management of a purchase order (PO). During Stage 1, the PO is issued (step 102). In general, the PO is issued by a Buyer and relates to one or more products offered for sale by the Seller. The Seller receives and processes the PO in order to initiate a sale. In order to keep an accurate record of pending and completed transactions, the Buyer may enter the PO into a General Ledger (GL) (step 104).

In Stage 2, payment terms are applied. For example, payment terms may be negotiated between a Buyer and a Seller. In some cases, the payment terms may include financing options. The Buyer receives the payment terms (step 106) and considers the financing options (step 108).

In Stage 3, the transaction continues when Seller provides the ordered product to the Buyer. Typically, a shipment receipt accompanies the shipped product and a vendor invoice is delivered to the Buyer at a later date. The vendor invoice may be generated by an Accounts Receivable system, for example, in response to order details input by the Seller. In this stage, the Buyer receives the shipped product (step 110), receives the vendor invoice (step 112), and then performs a three-way match of the received product with the original purchase order and the vendor invoice (step 114).

If all three sources agree, payment origination occurs in Stage 4. As shown, the Buyer performs an invoice posting and administration process (step 116). The process generally may involve reporting the invoice to a billing department, for example. Typically, payments must be authorized before being distributed. Assuming payment is approved (step 118), the Buyer may initiate payment. The payment may be made by an electronic funds transfer or other available method and may be delivered to the Seller along with a supporting remittance detail.

Stage 5 involves AP application. In particular, the Buyer updates the General Ledger (GL) to reflect the purchased product (step 120). Updating the GL may involve reducing Cash and increasing amounts of Supplies and Raw Materials. At the same time, the Seller may use the remittance detail for cash application within an A/R system. For instance, the Seller may reduce the outstanding balance in Accounts Receivable and increases the amount of cash on hand.

Usually, the Buyer will transfer funds to the Seller in an amount indicated by the vendor invoice. However, if there is a discrepancy when the three-way match is performed (step 114), the Buyer may submit payment in an amount different than the original invoice amount. In some cases, the Buyer may delay payment altogether pending dispute resolution.

In the even that there is a discrepancy between the amount paid and the mount owed, processing moves to Stage 6. In this stage, dispute resolution (step 122) occurs. In general, the Buyer and Seller exchange information in an attempt to reconcile their differences with the possibility that any uncollected difference will eventually be re-billed or written off.

In Stage 7, data integration (step 124) is performed. During this stage, data accumulated in the previous Stages is used to update an accounting system. Management information may be prepared to measure the effectiveness of the overall process. Measures such as Days Sales Outstanding, Cash Conversion Efficiency, and Bad Debt Rations might be used to assess performance.

In the AP process 10, described above, there are several inefficient process points that either require human intervention or are problematic for companies wishing to streamline their accounts payable process. For example, regarding invoice receipt and validation (e.g., Stage 3), receipt of vendor invoices in either electronic or paper form may present difficulties for some companies. Additionally, the use of human operators to review invoices for appropriate information and validate purchase orders and invoice information may result in significant errors and delay.

Regarding the payment approval and origination (e.g., Stage 4), obtaining invoice approval may involve complex processes. Furthermore, attempting integration with payment processes in accordance with vendor or transaction terms may be challenging.

With respect to AP application (e.g., Stage 5), application of approved PO and relevant transaction and/or payment information to an appropriate GL or internal systems may involve complicated procedures. Regarding dispute resolution (e.g., Stage 6), additional client review may be required for any unmatched and/or unapproved transactions. For data integration (e.g., Stage 7), the application of completed transactions to an internal application may pose significant challenges for a company.

Figure 2:
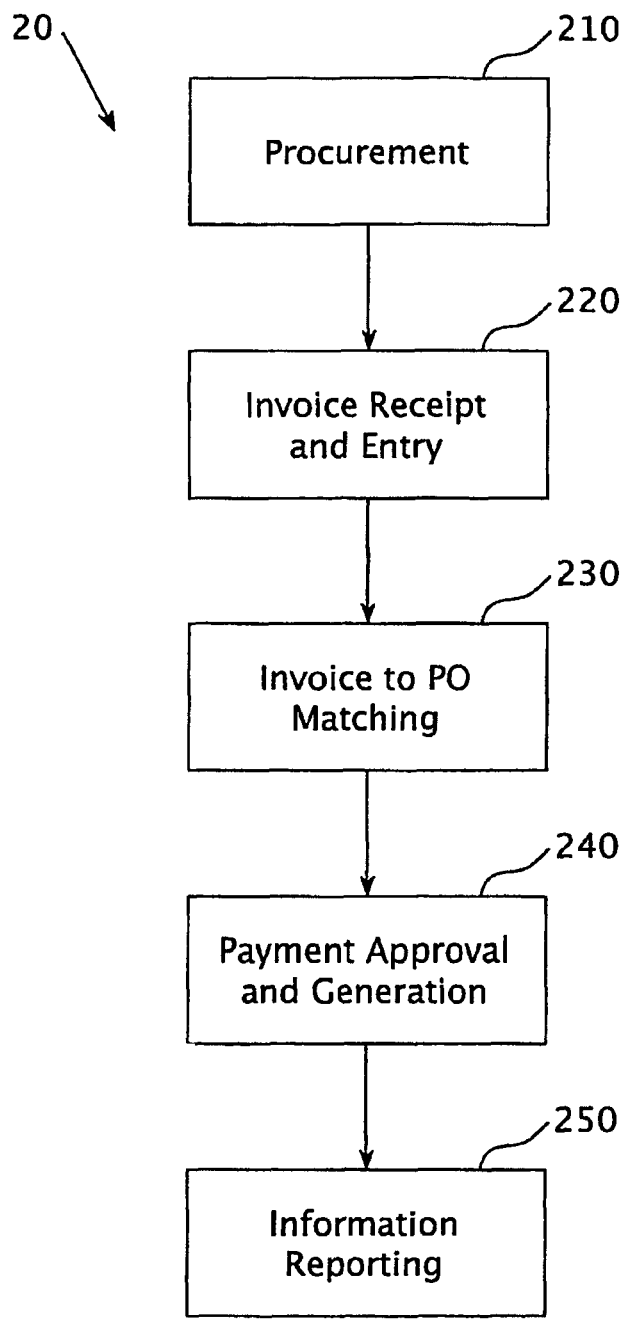
FIGS. 2-7 illustrate one embodiment of an AP procedure according to aspects of the present invention.

Referring to FIG. 2, a flow chart illustrates aspects of an AP procedure 20. As shown, the AP procedure 20 includes procurement (step 210), invoice receipt and entry (step 220), invoice to purchase order matching (step 230), payment approval and generation (step 240), and information reporting (step 250). The procedure 20 may be implemented by any suitable type of hardware (e.g., device, computer, computer system, equipment, component); software (e.g., program, application, instructions, code); storage medium (e.g., disk, external memory, internal memory, propagated signal); or combination thereof.

The AP procedure 20 begins with procurement (step 210), which generally relates to the activities leading up to and culminating with a Buyer placing an order for one or more products. Such activities may include, for example, accessing internal and/or external requirements, determining necessary products, selecting an appropriate vendor, and finally ordering one or more products from the selected vendor.

Procurement (step 210) may involve issuing a purchase order (PO) to a Seller. In some implementations, the Buyer may generate and/or update a PO file to reflect a pending transaction initiated by issuing the PO. In general, the PO file may include data representing some or all of the information contained in the PO. The PO file also may include data identifying a PO number assigned by the Buyer and/or Seller for referencing and/or tracking the PO. In one particular embodiment, a PO file format may include one or more of: PO Number, Vendor Number, Vendor Name, Vender Remit Address, PO Total Amount, PO Line Item Quantity, PO Line Item Amount, Discount Percent, and/or Discount Days. The PO file also may be updated to include data such as Invoice Number, Invoice Date, and/or Invoice Total Amount.

In cases where the PO is issued electronically, information from the PO may be imported into the PO file automatically. In other cases, an operator may generate and/or update a PO file by inputting PO information into a template presented by a graphical user interface (GUI).

The PO file may relate to one or more purchase orders and/or transactions. For example, each Buyer may compile a master PO file containing a comprehensive list of issued purchase orders and associated PO information. The Buyer may update the PO file as new purchase orders are issued. The PO file may be maintained locally by the Buyer and/or stored on a centralized host system in a network environment.

Procurement (step 210) further may involve generating and/or updating a vendor profile. In general, the vendor profile may include information about the Seller such as correspondence address, phone number, website address, e-mail address, and/or other contact information. The vendor profile also may include details about pending and/or completed transactions. Information from the PO may be imported automatically into the vendor profile and/or entered by an operator. In one particular embodiment, a vendor profile format may include one or more of: Customer Number, Vendor Name, Vendor Remit Address, Vendor Number, Contact Name, E-mail Address, Payment Terms, and/or Vendor Status. The vendor number generally may be used to identify, distinguish, and/or classify different vendors. The vendor number may be assigned by Buyer and/or furnished by the Seller.

In some cases, the vendor profile may correspond to one particular Seller. In other cases, the vendor profile may contain information regarding multiple Sellers. For example, the vendor profile may contain a comprehensive list of past, present, and prospective Sellers identified by the Buyer. The Buyer may continuously update the vendor profile as new orders are placed and/or as potential Sellers are identified. The vendor profile may be maintained locally by the Buyer and/or stored on a centralized host system in a network environment.

The AP procedure 20 also includes invoice receipt and entry (step 320) relating generally to the activities surrounding receiving an invoice associated with one or more ordered products and entering information from the invoice into an AP system. The invoice may reference one or more purchase orders and include information pertaining to the ordered products.

The invoice may be received in paper and/or electronic form. Usually, a paper invoice will be presented and/or shipped with an ordered product. After accepting the ordered product, the Buyer may route the invoice to a designated invoice processing area. In some implementations, an invoice may be converted from paper form into an electronic format. For example, a paper invoice may be scanned to generate a digital image.

The Buyer also may receive an invoice in an electronic format. For example, the Buyer may receive electronic data representing the invoice over a network that includes and/or forms part of an information delivery system, such as, Internet, the World Wide Web, and/or an analog or digital wireless telecommunications network.

A standardized electronic format may be employed in order to consolidate receipt of electronic and paper invoices. In general, the electronic format may support integration of the invoice data into a matching system (e.g., matching database) so that invoice data may be associated with client specific purchase order information.

Entry of invoice information may involve inputting data into an AP system. In some implementations, an operator may review the invoice and enter data into the AP system in accordance with client specific data entry requirements. The requirements may include, for example, entering an invoice number, PO total amount, and vendor address for each received invoice. A template may be used to establish common AP data entry requirements. In other implementations, data may be extracted from the invoice automatically. This may be possible, for example, where an invoice is received electronically and/or a paper invoice is converted into an electronic format.

Invoice receipt and entry (step 220) also may involve validating vendor information. In general, the process of validating may involve confirming that information associated with a vendor is correct. In one implementation, a Buyer may validate vendor information included in an invoice through a comparison with a client-specific vendor profile. For instance, a Buyer may create a vendor profile when an invoice is received from a Seller for the first time. The vendor profile may include, for example, contact information and a client-specified vendor number. When subsequently receiving an invoice from the Seller, the Buyer may reference the vendor profile to make sure that the invoice information and the vendor profile convey the same information.

Invoice to PO Matching (step 230) relates to the process of automatically matching client-specified information to a received invoice. In general, a Buyer may input complex, multi-dimensional specifications (e.g., vendor invoice data) into an AP system in order to locate items from a dynamic data set (e.g., client's vendor/purchase order information) that best fit the specifications. In some implementations, after vendor information from an invoice is validated, the Buyer conducts a multi-dimensional match of the invoice to a client PO file.

Matching may involve presenting exact matches as well as near matches. In general, near matches may be defined as a set of probable matches based upon client specified multi-dimensional criteria. The identification of near matches may be based on numerous factors including, for example, common keying errors and variation from an exact match. The factors considered may be appropriately weighted according to their tendency to return a match.

Invoice to PO matching (step 230) also may involve augmenting invoice data with purchase order information. For example, information from a matching PO file may be appended to invoice data to reconcile incorrect and/or incomplete data elements. In some cases, PO information may be appended or linked to the scanned image of an invoice. Augmenting the invoice data in such ways may facilitate the payment approval process.

After a PO file has been matched to the invoice, the original payment terms may be reviewed for further confirmation that the invoice amount is correct. In some implementations, a prior invoice and/or a vendor profile may be referenced to verify that the invoice amount is typical for the type of order or for the particular vendor.

The AP procedure 20 further includes payment approval and generation (step 240) relating to the process by which payment to the Seller for a received product is authorized. In general, the Buyer will approve payment for conforming goods according to the payment terms. In some implementations, matched items (e.g., invoice and PO information) may be transmitted to a billing system for presentment, review, and adjudication. For example, the matched items may be compared against client parameters established for automated payment approval.

The AP procedure 20 also includes information reporting (step 250) generally relating to presenting data related to one or more transactions in a user-specified format. In general, reporting information may involve capturing data involved with a transaction, generating one or more data files based on the captured data, and outputting information regarding the one or more transactions to a user. In some cases, data may be routed to a printing system for reporting information in paper form. In other cases, the information may be reported in electronic form through a graphical user interface (GUI) that includes text, images, audio, video and/or other media for conveying information to a user. Reporting information in electronic form may involve utilizing the capabilities of Internet and/or wireless technologies. For example, information may be reported through an interactive Web page displayed by a browser application in response to data communicated over wired and/or wireless data pathways.

Reporting information also may involve interpreting the data and suggesting financial strategies. For example, the Buyer may be presented with pricing strategies and/or marketing strategies for improving the flow of the Financial Supply Chain.

Figure 3:
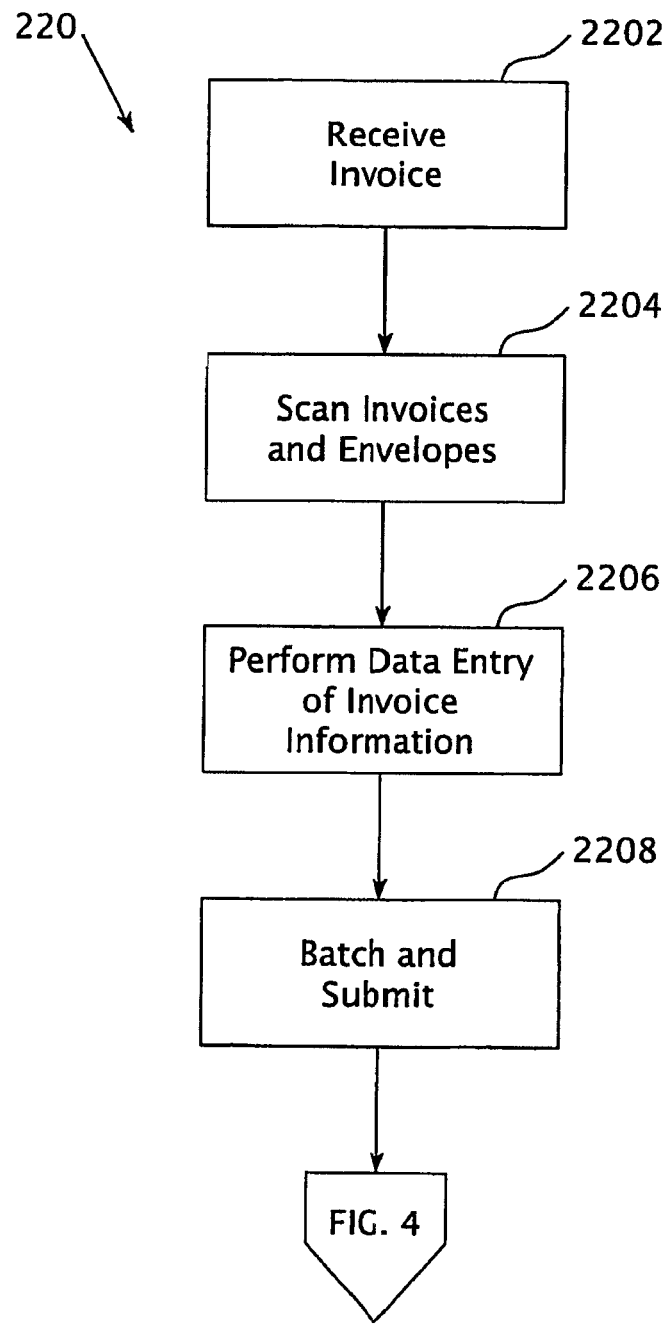

Further details regarding aspects of invoice receipt and entry (step 220) are provided with reference to FIG. 3. In this implementation, the process of begins when an invoice for an ordered is product is received (step 2202). In some cases, one or more AP operators may be assigned the task of collecting documents (PO invoices, non-PO invoices, Vendor Statements) associated with ordered/received products. An AP operator may collect the documents upon arrival or at regular intervals and then sort the documents based on an established criteria (e.g., document type). Each of the invoices may in turn be sorted by number of pages and/or otherwise prepared for image processing.

Next, the invoices are scanned by a visual imaging system (step 2204). Scanning may involve generating a digital image and associating a time stamp with each invoice. The digital images may be maintained in one or more designated storage locations (e.g., database, file structure, table) within the AP system. In some embodiments, invoices (and envelopes) may be stored as checks and remittances by the AP system. Once the images are scanned, the AP operator may view the image on a GUI to ensure that the image is readable. Then, the images may be uploaded to an indexing station and queued for further processing. Typically, the actual (i.e., paper) invoice also will be forwarded to the indexing station.

Next, data entry is performed for each invoice (step 2206). In general, data may be entered according to a standard invoice file format. The standard invoice file format may include fields for entering one or more of: PO Number, PO Line Item Quantity, PO Line Item Amount, Vendor Number, Vendor Name, Vendor Address (i.e., "Remit To" Address), Invoice Number, Invoice Date, Invoice Total Amount, Discount Percent, and/or Discount Days. Because invoices may or may not be associated with a PO, some information (e.g., PO Number, PO Line Item Quantity, PO Line Item Amount) may not be available for entry. In such cases, an AP operator may enter an invoice category (e.g., PO invoice/non-PO invoice) for each invoice. The category selected may automatically display the appropriate fields on a screen for entering the invoice information. In addition, invoices that are associated with a PO may require having a service entry sheet entered into the AP System.

Data entry may involve an AP operator reviewing the invoice in paper or digital form and manually entering information into the AP system in accordance with the invoice file format. In some cases, a character recognition process may be applied to the digital image so that invoice data is extracted and entered automatically. Data entry also may include verifying that the PO number (if applicable) on the invoice is valid, for example, by referencing a PO file. If the PO number is invalid, further investigation as appropriate is performed.

After confirming that the PO number is valid, the invoice data is batched and submitted for further processing (step 2208). In general, the invoice data may be batched in an ad hoc format whereby invoice data is grouped and transferred for matching by the AP system. In some cases, batching may include assigning document numbers to each invoice so that the invoice data may be routed to an appropriate processing unit. For example, PO invoices may be automatically assigned a document number and directed to an appropriate processor based on alphabetical assignment. Non-PO invoices also may be automatically assigned a document number based on transaction type, parked in the AP system, and directed to the appropriate processor based on alphabetical assignment by the Indexer.

Figure 4:
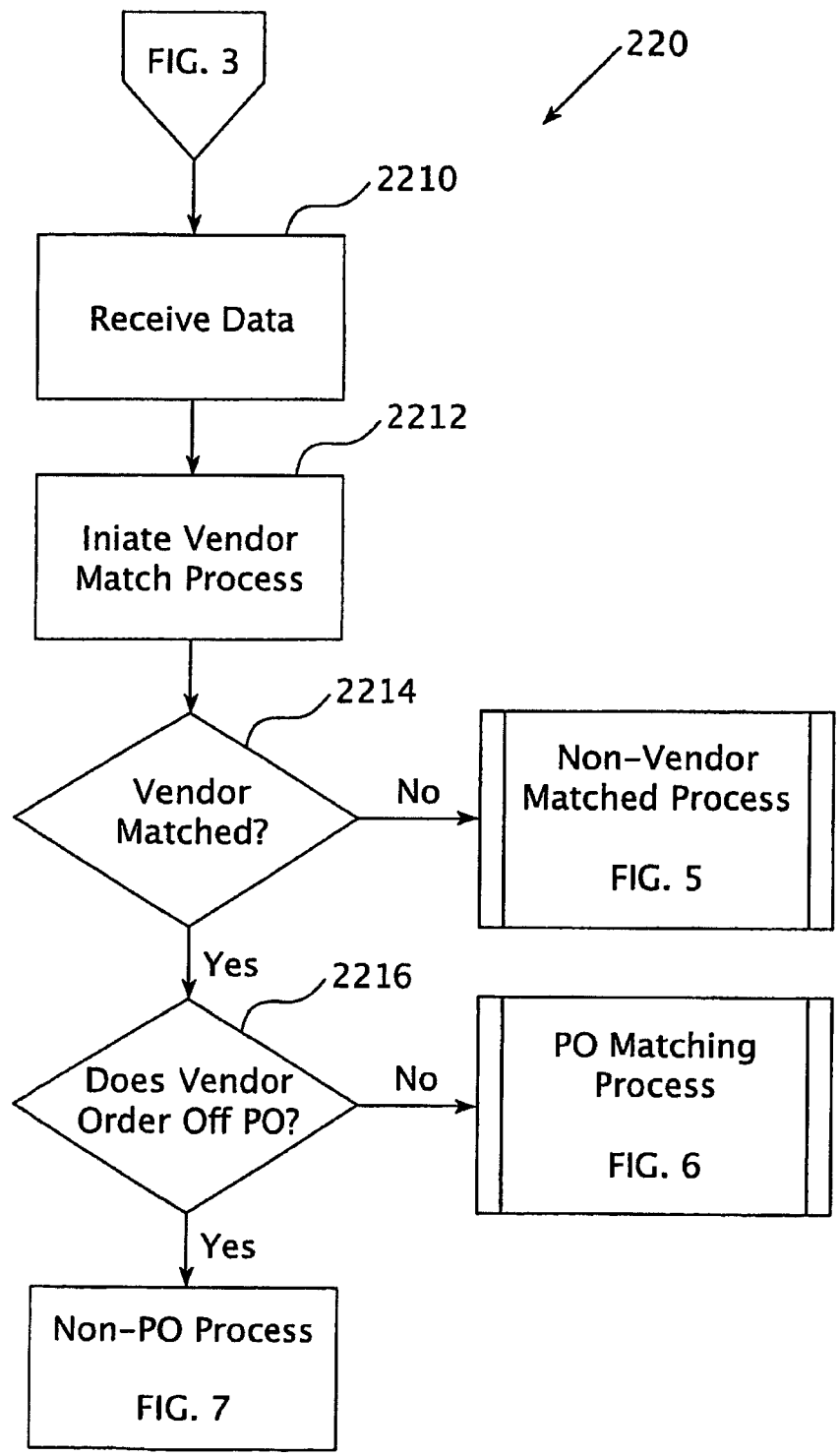

Referring to FIG. 4, the process of invoice receipt and entry (step 220) continues with receiving data at the AP system (step 2210) and initiating a vendor matching process (step 2212). In this implementation, the AP system receives the submitted invoice data as well as a customer specified PO file and a customer specified vendor file. In general, the PO file may be created at the time an order is placed and may be maintained by the AP system before the invoice for the order is received. In some cases, the vendor file also may be created when an order is placed and maintained by the AP system prior to receiving the invoice. The vendor file may be, for example, a master vendor list containing information regarding all the vendors associated with a Buyer. The AP system may receive and add the information for each invoice to a matching database as invoice header records.

The vendor matching process generally involves positively identifying the vendor listed on the invoice. Usually, all invoice records are subjected to the vendor match. In this implementation, the AP system may initiate the vendor matching process (step 2212) by automatically pulling vendor information from the vendor file and/or PO file. The AP system then determines whether there is a preliminary vendor match (step 2214).

In some cases, the AP system may look up address information (e.g., street, city, state) assigned to a particular vendor using the vendor number and then compare the address information to the data entered in the Vendor Address (i.e., "Remit To" Address) field of the invoice format. While in other implementations, vendors may be identified by other types of information, using vendor address information as the primary identification key is more likely to yield a unique solution.

In addition, the vendor file and/or the PO file may be checked against the Vendor Name field and/or the actual invoice to verify that all information is identical. If the Vendor Name does not agree with the PO file and the vendor file, further investigation as appropriate is performed. Assuming that all information associated with the vendor is correct, the AP system validates the Vendor Number associated with the particular transaction. The invoice data then may be maintained in a storage location within the AP system until further processing (e.g., PO matching) is required. In addition, the actual invoices may be filed by date (i.e., time stamp) and stored in preparation for further processing.

Figure 5:
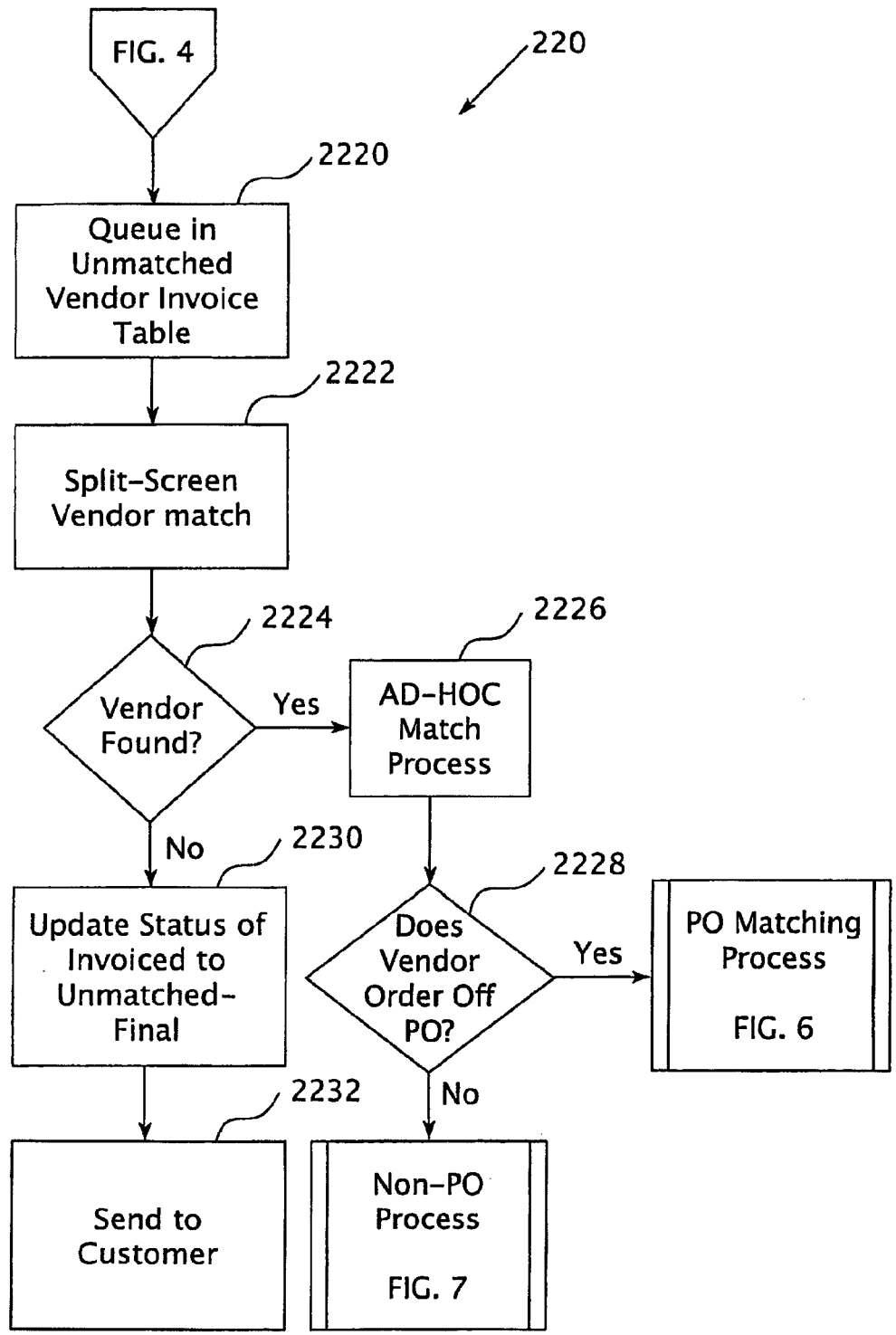

If there is no match for a vendor, however, the AP system initiates a non-vendor matched process, aspects of which are illustrated by FIG. 5. On the other hand, when there is a match, the AP system queries whether the vendor utilizes purchase orders (step 2216). The vendor file and/or the invoice data may be references to make this determination. For example, as part of the process of generating the vendor file, a Buyer may indicate whether it is the standard business practice of the vendor to use purchase orders. Additionally, if the invoice references a PO, it may be assumed that the common practice of the vendor is to supply products based on purchase orders.

Figure 6:
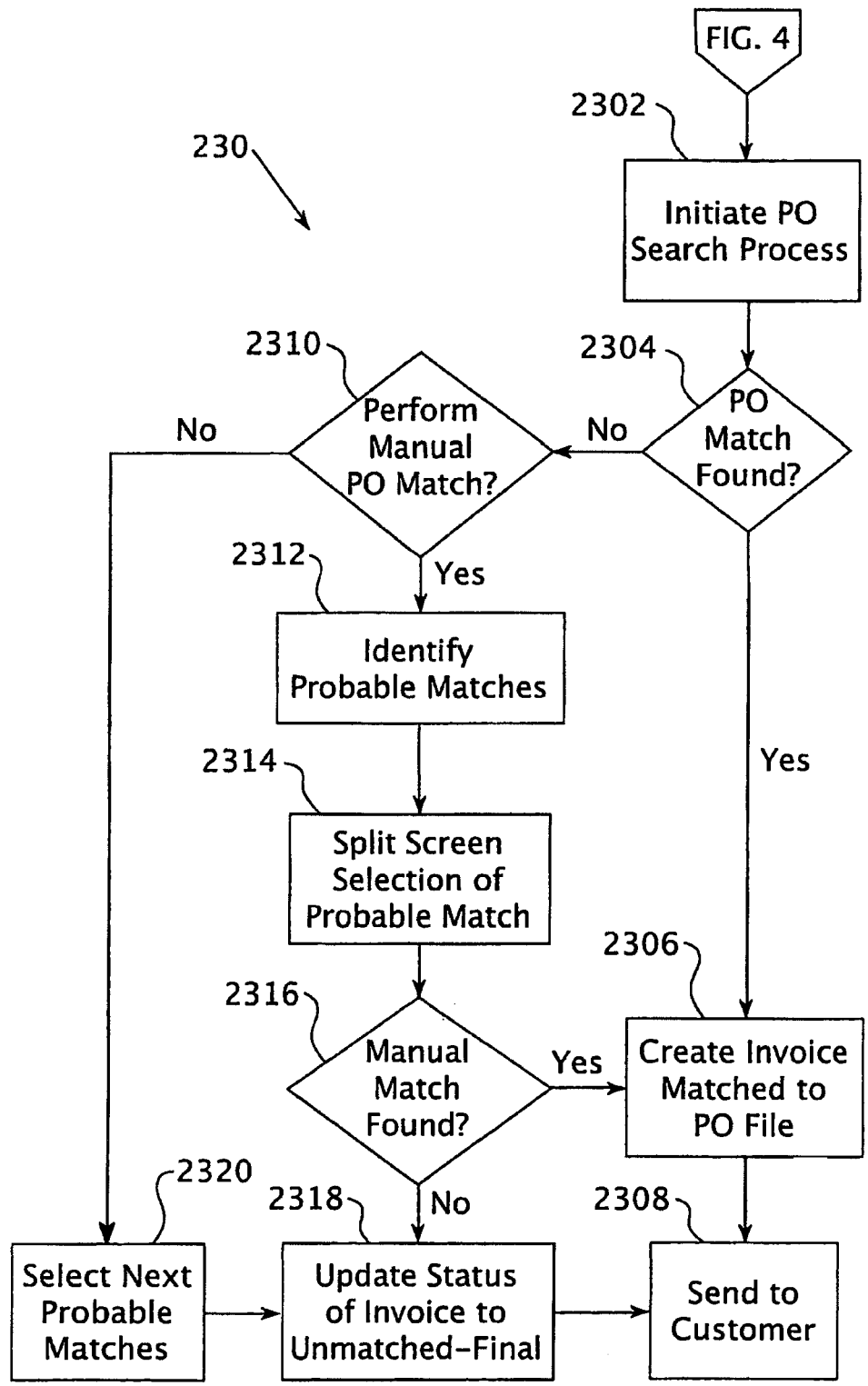
Figure 7:
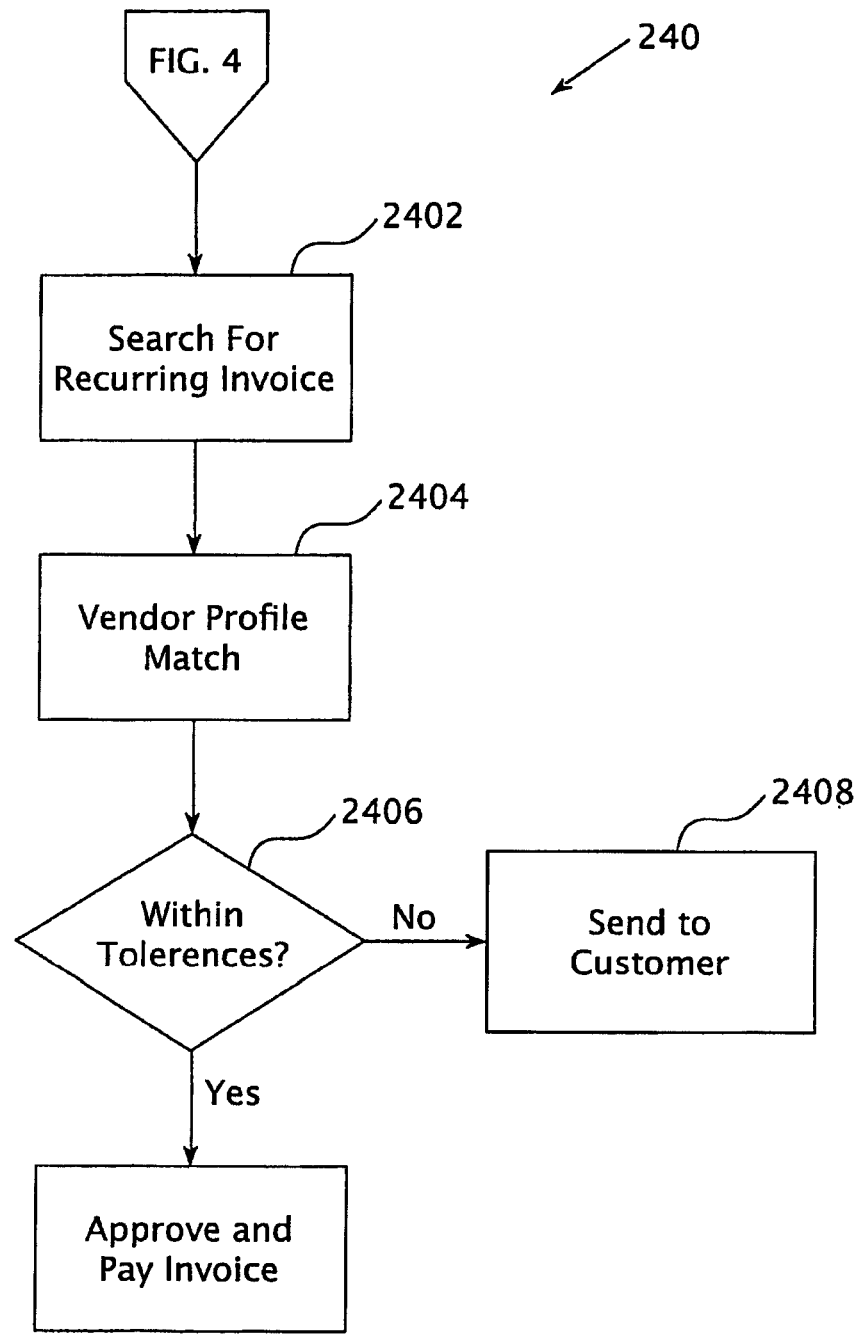

If the vendor does indeed utilize purchase orders, the AP system initiates a PO process, aspects of which are illustrated by FIG. 6. Conversely, if the vendor does not utilize purchase orders or it cannot be determined whether the vendor utilizes purchase orders, the AP system initiates a non-PO process, aspects of which are illustrated by FIG. 7.

Turning now to FIG. 5, the non-vendor matched process generally may be considered as part of the procedures involved with invoice receipt and entry (step 220). As shown, when no vendor match is found, the invoice data is queued in an unmatched vendor invoice table (step 2220). Table 1 is one example of a format that may be used for the unmatched vendor table. Generally, the vendor data is automatically placed into the appropriate fields of the unmatched vendor invoice table where it is queued for matching.

TABLE 1

| 1$^{st}$ Data Key | 2$^{nd}$ Data Key | 3$^{rd}$ Data Key | 4$^{th}$ Data Key | 5$^{th}$ Data Key |
|---|---|---|---|---|
| Remit Address | | | | |
| Remit Address | Vendor Number | | | |
| Remit Address | Vendor Number | PO Number | | |
| Remit Address | Vendor Number | PO Number | PO Amount | |
| Remit Address | Vendor Number | PO Number | PO Amount | Vendor Name |

When the transaction (i.e., invoice data) reaches the front of the queue, matching criteria is applied to the data within the unmatched vendor table. Table 2 demonstrates one example of how matching criteria may be applied to the fields in the unmatched vendor table of Table 1.

TABLE 2

| Match Criteria | | | | |
|---|---|---|---|---|
| Exact-Off 1 Char | | | | |
| Off ≥ 2 Characters | Exact-Off 1 Char | | | |
| Off ≥ 2 Characters | Off ≥ 2 Characters | Exact-Off 1 Char | | |
| Off ≥ 2 Characters | Off ≥ 2 Characters | Off ≥ 2 Characters | Exact-Off 1 Char | |
| Off ≥ 2 Characters | Off ≥ 2 Characters | Off ≥ 2 Characters | Off ≥ 2 Characters | Exact-Off 1 Char |

Application of the matching criteria is designed to identify one or more vendors that match or nearly match client specified vendor profiles resident within the AP system. In general, the concept of applying "near matching" involves the process of identifying the best matches based upon numerous factors that are given appropriate weight. Near matching also encompasses the process of suggesting probable matches by considering common keying errors as well as suggesting probable matches falling within a specified tolerance range of an exact match.

The AP system may present exact matches or identify a set of likely matches based upon client specified multi-dimensional criteria. In general, the AP system may match data fields and determine potential matches based upon client specific requirements and/or client profile logic. For example, the AP system may be configured to locate specific items from a dynamic data set (e.g., vendor profile information) that best fit a complex, multi-dimensional specification (e.g., vendor invoice data).

In one implementation, the AP system compares the invoice data against a master vendor profile in accordance with the matching criteria of Table 2. Namely, the AP system receives data from the fields of the unmatched vendor invoice table and compares the data against corresponding vendor profile data. As indicated by the columns of Table 1, the unmatched vendor invoice table includes several data keys. In this implementation, five data keys are employed; however, more or fewer data keys may be used in other implementations.

The first data key is the primary data key and corresponds to the Vendor Number field. As this process is defined as a non-vendor matched process, it already has been established that there is not an exact match for the Vendor Number. As demonstrated by Table 1 and Table 2, a vendor from the master vendor profile may be identified as a near match if the Vendor Number fields differ by only one character. That is, all vendors having a vendor number that differs only by one character from the vendor number listed of the invoice may be returned as near matches.

Furthermore, additional near matches may be identified based on the remaining data keys. For example, the second data key corresponds to the Vendor Name field. Even if the Vendor Number fields differ by two or more characters, a vendor from the master vendor profile may be identified as a near match so long as the Vendor Name fields are identical or differ only by one character. The third data key corresponds to the Vendor Address ("Remit Address") field. Even if the Vendor Number fields and the Vendor Name fields each differ by two or more characters, a vendor from the master vendor profile may be identified as a near match so long as the Vendor Address ("Remit Address") fields are identical or differ only by one character. The fourth data key corresponds to the PO Number field. Even if the Vendor Number fields, the Vendor Name fields, and the Vendor Address ("Remit Address") fields each differ by two or more characters, a vendor from the master vendor profile may be identified as a near match so long as the PO Number fields are identical or differ only by one character. And, the fifth data key corresponds to the PO Amount. Even if the Vendor Number fields, the Vendor Name fields, the Vendor Address ("Remit Address") fields, and the PO Number each differ by two or more characters, a vendor from the master vendor profile may be identified as a near match so long as the PO Amount fields are identical or differ only by one character.

In some implementations, the third data key (i.e., Remit Address) may include matching sub-logic within this field. For example, the field may include Street Address as first data key, City as a second data key, State as a third data key, and Zip (plus 4) as a fourth data key. Near matching may be applied to such data keys as described above.

It should be noted that for vendors that do not utilize purchase orders, PO information might be unavailable. Consequently, all data keys might not be applied. Furthermore, in some implementations, a subsequent data key may be applied only when application of the preceding data key fails. For example, if a vendor having a near matching vendor number is identified, a user (e.g., AP operator) may be asked whether that vendor is correct before performing further searching.

Application of matching criteria may use one or more methods broadly categorized as Instance Based Learning, Machine learning, Knowledge discovery, Classification, Record linkage, Clustering methods, and/or variants thereof. For example, the AP system may employ one type of Instance Based Learning algorithm known as k-Nearest Neighbors (kNN). In general, kNN is based on calculations of distances between records in the dataset. All records are assumed to be points in a multi-dimensional space. The value of any point introduced into that space is determined by a majority vote of its k nearest neighbors. The values of new instances may be determined from the values of known instances. Various metrics may be used to measure the distance in space between the records. Examples of metrics include, but are not limited to: Euclidean, Manhattan, Minkovsky, Tchebyshev, Canberra, and Hausdorff.

In one implementation of the AP system, the distance between two records might be defined as a function of the difference in the Vendor Number, Vendor Name and Vendor ZIP with each one contributing a different weight to the distance. The classification of records from the given dataset may take place in two stages. First, for a given record k-nearest neighbors are searched. Next, the record in question is assigned to the class where the majority of records from the set of k-nearest neighbors belong. The fraction of neighbors from different classes may serve as an estimation of probability for assigning the record to a given class. The records in the class to which the given record belongs to can then serve as the near matches for it.

After one or more probable vendors are identified by the AP system, the results are presented through a graphical user interface and a manual vendor match may be performed (step 2222). In some applications, an AP operator may view a split screen presenting the probable vendor matches on one side of the screen and the digital image of the invoice on the other side. The AP operator visually may compare the information presented on the split screen and determine whether the correct vendor is found (step 2224).

If the correct vendor is found, for example a vendor having a near matching vendor number with the same "remit to" address, the AP operator may enter the correct vendor number on the appropriate screen. After selecting the correct vendor, the AP system may initiate an ad hoc matching process (step 2226). The user also may perform ad hoc data entry by manually entering additional search criteria. In this implementation, once the vendor record is corrected, an ad-hoc process may be initiated to find a PO match.

The next steps generally are similar to steps described in connection with FIG. 4. For instance, the AP system queries whether the vendor utilizes purchase orders (step 2228). Again, the vendor file and/or the invoice data may be referenced to make this determination. If the vendor utilizes purchase orders, the AP system initiates a PO matching process, aspects of which are illustrated by FIG. 6. Conversely, if the vendor does not utilize purchase orders or it cannot be determined whether the vendor utilizes purchase orders, the AP system initiates a non-PO process, aspects of which are illustrated by FIG. 7. In some cases, an AP operator may have the option of using split screen verification to continue to work on and close out the record. Otherwise, normal processing is followed.

If application of the matching criteria returns no near vendor matches or if the AP operator cannot make a manual vendor match using split screen verification, the final status of the invoice status may be indicated as "unmatched vendor—final" (step 2230) and the customer may be notified (Step 2232). Typically, the AP system may notify the customer (e.g., Buyer) of the final vendor matching status and submit a request to create an additional vendor record in the master vendor file.

Referring to FIG. 6, further details regarding aspects of invoice to PO matching (step 230) are provided. In general, the process attempts to match invoice data with corresponding PO information. In some cases, an invoice may pertain to goods shipped in reply to multiple purchase orders.

In one implementation, the AP system initiates a PO search process (step 2302). Generally, the search process may involve comparing certain pieces of invoice information against stored PO data. The AP system may obtain the invoice information, for example, by examining or processing the digital image of the invoice or by extracting data from selected invoice data fields. For example, the AP system may extract the data entered into the fields for PO Number, Vendor Number, and PO Total Amount for a particular invoice record. Based on this information, the AP system then may make a preliminary determination as to whether a PO match is found (step 2304). Namely, the AP system may search the information resident within the system for a PO file having an identical PO number, vendor number, and PO amount.

If an exact PO match is found, the AP system may create an invoice matched to PO file (step 2306) and then send the file to the customer (step 2308). In general, the invoice matched to PO file may contain the invoice data including the digital invoice image and any PO information required to authorize payment.

If an exact PO match is not found, the AP system then determines whether manual PO matching may be performed (step 2310). The AP system generally may possess the ability to perform manual PO matching as long as client-specified PO files are resident within and accessible to the AP system. If manual PO matching is possible, the AP system may identify one or more probable PO matches (step 2312). In general, matching criteria may be applied to the invoice data in order to identify one or more purchase orders that match or nearly match client specified PO files resident within the AP system. As described above, the AP system may be designed to return likely matches based upon numerous weighted factors. For example, the AP may identify near or probable matches by taking into account common keying errors, as well as a client specified tolerance range.

In one implementation, the AP system may identify probable or near PO matches based on data entered in the invoice data fields for PO Date, Invoice Date, and PO Total Amount. In this case, a first data key may be defined by the PO date field, a second data key may be defined by the Invoice Date field, and a third data key may be defined by the PO Total Amount field. The AP system may use one or more of the data keys to identify a purchase order as a near match by comparing data in the fields of a PO file with data in corresponding invoice data fields.

In general, a purchase order may be considered to nearly match an invoice if certain purchase order information does not differ significantly from corresponding invoice information. In some implementations, a purchase order may be identified as a probable match if the compared data varies by only one character. For instance, invoice data may be matched to a PO file so long as the PO Number fields differ by only one character. Performing near matching in this way may take into account discrepancies resulting from simple keying errors, for example.

In some embodiments, a purchase order may be identified as a near match so long as certain PO data falls within a certain tolerance range of the corresponding invoice data. For instance, a purchase order may be identified as a potential match if its PO date falls within a certain tolerance range (e.g., one week) of the PO date indicated by the invoice. Similarly, a purchase order may be identified as a potential match if its PO total amount falls within a certain tolerance range (e.g., above and/or below a certain dollar amount) of the PO total amount indicated by the invoice. The degree to which a near match is permitted to differ from an exact match may be a preset default value or a client-specified value.

After one or more probable purchases orders have been identified by the AP system, the purchase orders may be presented on a split screen and a manual PO match may be performed (step 2314). For instance, an AP operator may view a split screen presenting the probable PO matches on one side and the digital image of the invoice on the other side. In some cases, the matching results may be classified into specific resolution categories. The AP operator visually may compare the information presented on the split screen and determine which, if any, of the identified probable PO matches corresponds to the invoice (step 2316).

If the AP operator makes a manual match, each of the appropriate PO files is associated with the invoice data. In addition, the AP operator may correct and/or augment the invoice data. For example, information from a matching PO file may be used to correct the invoice data and reconcile incorrect and/or incomplete data elements. Furthermore, in some cases, PO information may be appended or linked to the scanned image of the invoice to facilitate the payment approval process. After all PO matches are made, the AP system may create an invoice matched to PO file (step 2306) and send the file to the customer (step 2308), as described above. The user also may have the ability to manually enter additional search criteria.

If application of the matching criteria returns no PO matches or if the AP operator cannot make a manual PO match using split screen verification, the final status of the invoice may be indicated as "unmatched PO—final" (step 2318), and the unmatched invoice may be sent to the customer (step 2308).

Additionally, if the AP system is unable to perform a manual match for the particular invoice (step 2306), the AP system may record the invoice information in a file of unmatched invoices (step 2320), indicate the final status of the invoice is to be "unmatched PO—final" (step 2318), and then send the unmatched invoice to the customer (step 2308).

Referring to FIG. 7, details regarding aspects of a non-PO process are provided. As indicated above, a non-PO process may be performed in situations where an invoice is received from a vendor that does not use purchase orders. In such situations, invoice to PO matching (step 230) generally should be avoided, since an attempt to match the invoice data to a PO file conceivably could identify a nearly matching yet incorrect purchase order. Therefore, the non-PO process typically will be performed after invoice receipt and entry (step 220) and may be considered as part of payment approval and generation (step 240).

In general, the non-PO process match process attempts to authorize and initiate payment based on non-PO information. In one implementation, the AP system searches a database of stored invoice data relating to prior transactions in order to determine if the current invoice matches a recurring invoice (step 2402). The AP system may search for recurring invoices that generally occur within the same date range (e.g., placed/shipped the same time each month), are from the same vendor, pertain to similar products, and/or are for a comparable dollar amount, for example. If no recurring invoice is found, the AP system may search for a vendor profile of the vendor listed on the invoice (step 2404).

The AP system then may determine whether the current invoice falls within a tolerance range necessary to authorize payment (step 2406). In general, the current invoice is compared to a recurring invoice and/or the vendor profile. For instance, if a recurring invoice is found, the AP system may determine whether payment can be automatically authorized based on the similarities between the current invoice and the recurring invoice. If the vendor profile is retrieved, the AP system may determine whether the current invoice is consistent with attributes of the vendor. For example, the AP system may analyze the vendor profile to confirm whether the products, service time, and/or shipment methods indicated by the invoice are typical of the vendor in question. If the AP system is unable to conclude with relative certainty that the current invoice should be paid, the AP system notifies the customer (step 2408). In general, notification may involve sending the invoice data to the customer (e.g., Buyer) for further review.

Figure 8:
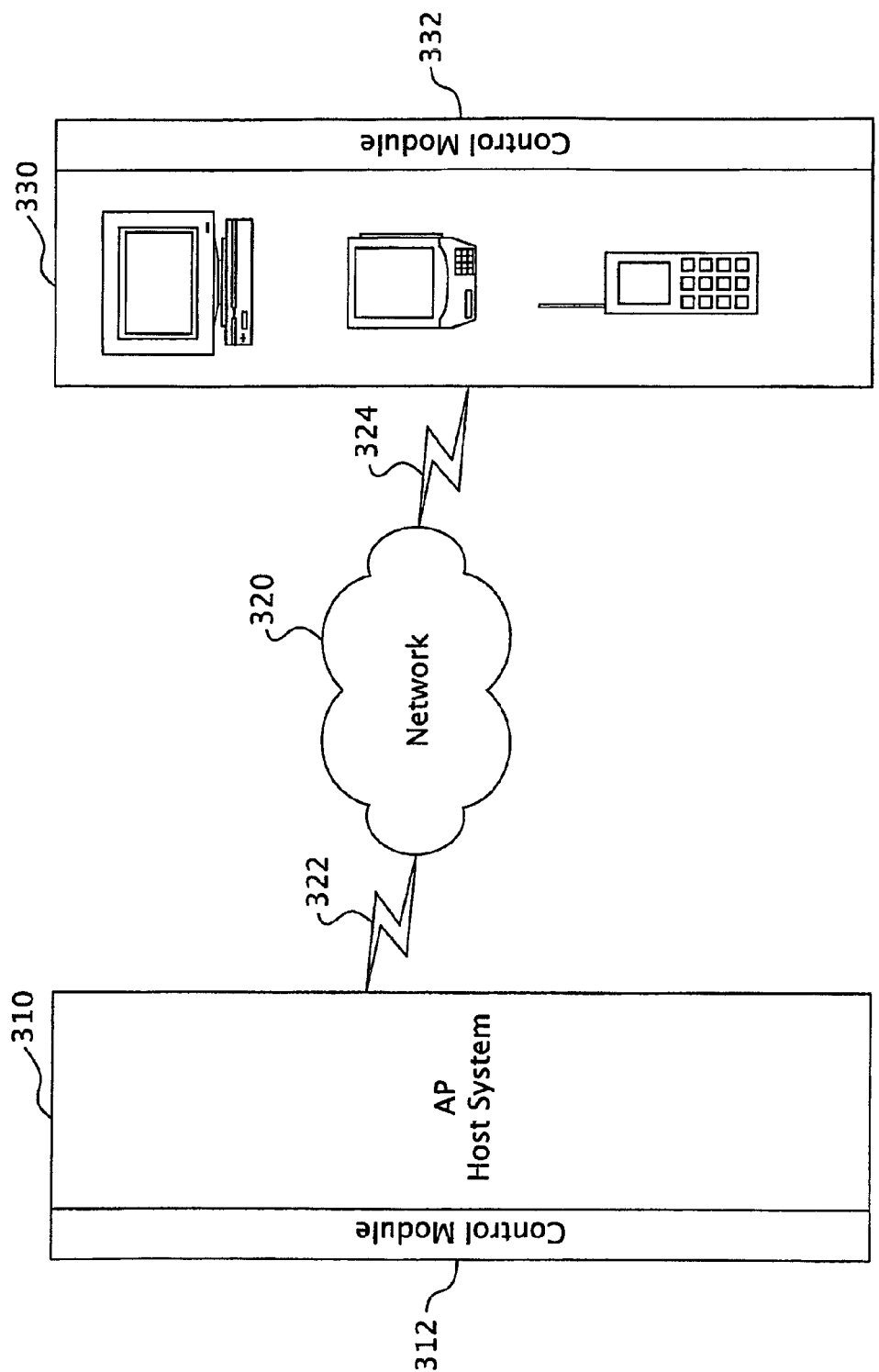
FIGS. 8 and 9 illustrate one embodiment of an AP system according to aspects of the present invention.

FIG. 8 illustrates one implementation of an exemplary computer system 30 capable of performing aspects of AP matching described above. As shown, the computer system 30 includes an AP host system 310 connected through a network 320 to a client system 330. For brevity, several elements in the figure are represented as monolithic entities.

In general, the AP host system 310 may be configured to receive, store, and/or process purchase order information, vendor information, and invoice information. For example, the AP host system 310 may perform matching techniques regarding invoice information, purchase order invoice information, and/or vendor information. In one implementation, the AP host system 310 may automatically match client specific vendor and/or purchase order information against invoice data related to a received invoice. The AP host system 310 also may present exact matches or identify a set of likely matches based upon client specified multi-dimensional criteria. In addition, the AP host system 310 may allow vendor verification against a vendor profile.

The network 320 may be configured to deliver data between the AP host system 310 and the client system 330. In general, the network 320 may be a wired or wireless communication network capable of directly or indirectly connecting the AP host system 310 and the client system 330 irrespective of physical separation. In one implementation, the network 320 interfaces with the AP host system 310 through a first communication pathway 322 and interfaces with the client system 330 through a second communication pathway 342. The first communication pathway 322 and the second communication pathway 324 may each include one or more wired or wireless data pathways and delivery systems configured to direct and deliver data.

The network 320 may include one or more of: a local area network ("LAN"), a wide area network ("WAN"), the Internet, the World Wide Web, a telephony network (e.g., analog, digital, wired, wireless, PSTN, ISDN, or xDSL), a radio network, a television network, a cable network, a satellite network, and/or any other wired or wireless communications network configured to carry data. Each network may include one or more interconnection elements, such as, for example, intermediate nodes, proxy servers, adapters, routers, and/or switches.

The client system 330 may be configured to present information to a client (e.g., Buyer), receive information from the client (e.g., data input), and exchange information with the AP host system 310 through the network 320. For example, the client system 330 may present and/or receive information through interactive GUIs. The client system 330 may generate purchase order files and/or vendor profiles in response to information specified by the client. In some cases, presented information may be reviewed by the client for approval and dispute management.

In some implementations, the client system 330 presents and receives information from a customer in accordance with aspects of AP matching techniques, described above. For example, the client system 330 may receive matched invoice and purchase order information from the AP host system 310. The client system 330 also may be presented with vendor information and/or purchase order information that exactly or nearly matches invoice data requirements. In such cases, the client system 430 may receive input from the customer indicating a confirmation and/or selection of the correct vendor information and/or purchase order information.

The AP host system 310 and the client system 330 each may include or form part of a computer system having hardware and/or software components for communicating with each other through the network 320 and for interacting to perform aspects of AP matching. The AP host system 310 and the client system 330 may be structured and arranged to communicate using various communication protocols (e.g., http, WAP) and/or encapsulation protocols (e.g., UDP), to establish connections (e.g., peer-to-peer) between network elements, and/or to operate within or in concert with one or more other systems (e.g., the Internet and/or Web).

In one implementation, the AP host system 310 includes one or more devices operating under the direction of a host control module 312, and the client system 330 includes one or more devices operating under the direction of a client control module 332. Examples of such devices include, but are not limited to: a general-purpose computer, a special-purpose computer, a personal computer ("PC"), a workstation, a server, a laptop, a Web-enabled telephone, a Web-enabled personal digital assistant ("PDA"), an interactive television set, a set-top box, an on-board (i.e., vehicle-mounted) computer, or any other computing element capable of responding to and executing instructions.

An example of a control module is a software application (e.g., operating system, Internet service provider application, browser application, server application, proxy application, gateway application, tunneling application, and/or other communications application) loaded on a device for commanding and directing communications enabled by the device. Other examples include a computer program, a piece of code, an instruction, another device, or some combination thereof, for independently or collectively instructing a device to interact and operate as desired. The control module may be embodied permanently or temporarily in any type of machine, component, physical or virtual equipment, storage medium, or propagated signal capable of providing instructions to a device. In particular, the control module (e.g., software application, computer program) may be stored on a storage media or device (e.g., ROM, magnetic diskette, or propagated signal) readable by a computer system, such that if the storage media or device is read by a computer system, the functions described herein are performed.

Figure 9:
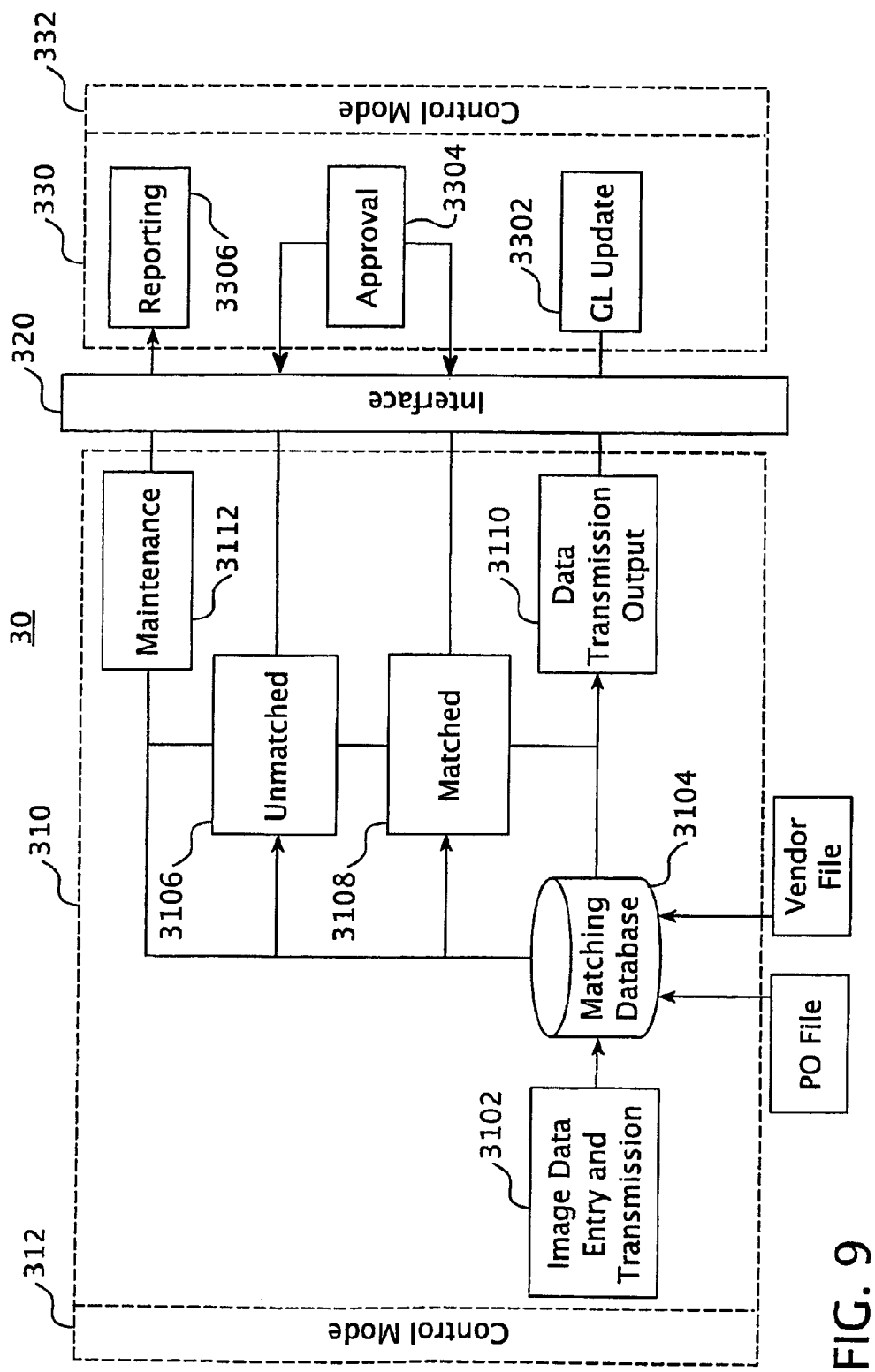

Turning now to FIG. 9, further details of the system 30 are provided. In one implementation, the AP host system 310 includes a data transmission input device 3102, a matching database 3104, an unmatched file processor 3106, a matched file processor 3108, a data transmission output device 3110, and a maintenance processor 3112.

In general, the image data entry and transmission device 3102 may contain hardware and/or software for implementing processes related to invoice receipt and data entry (step 220) and/or invoice to purchase order matching (step 230). For example the image data entry and transmission device 3102 may be configured to receive invoices in paper and/or electronic form, convert paper invoices to digital images, extract data from a digital image, and/or accept data entry from a user. The image data entry and transmission device 3102 also may generate AP files containing invoice data and forward such files to the matching database 3104 for integration.

The matching database 3104 may contain hardware and/or software for implementing processes related to invoice receipt and data entry (step 220) and/or invoice to purchase order matching (step 230). While implementations of the matching database 4104 are not limited to any particular hardware and/or software, one embodiment of the matching database specifically contemplates modifications to iX Matching technology available from Powerloom Inc., dba Dynamix.

In general, the matching database 3101 may be provided with image access capabilities, decision-making logic, and matching criteria. The matching database 3104 may be capable of connecting to multiple sites within the AP system 30 as well as multiple client sites across the network 320. Digital images and other electronic data may be supported in a variety of formats by the matching database 3104 so that data may be accessed, aggregated, and/or moved within the AP system 30 and across the network 320. Control of the matching database 3104 may be provided from a centralize access control site and/or be distributed across several sites.

In one implementation, the matching database 3104 may be designed to receive invoice data, purchase order data, and vendor data from a variety of sources and in a variety of file formats. The matching database 3104 may support simultaneous AP processing for multiple enterprise customers and provide each customer with a private portal to interact with the AP processing service.

As described above, the matching database 3104 may receive invoice data including digital images of scanned invoices from the data transmission input element 3102. In addition, the matching database 3104 may import purchase order data and/or vendor data from one or more sources. For example, the matching database 3104 may receive PO files and vendor profiles through the data transmission input device 3102, from the client system 430, or from some other system (e.g., billing system, vendor system). In general, the matching database 3104 may be configured to maintain flexibility so that data may be periodically imported and/or imported on demand.

The matching database 3104 may be configured to store received data in a variety of ways. In some cases, the matching database 3104 may maintain client-specific records for each customer. For example, the matching database 3104 may maintain and aggregate PO files and/or vendor profiles associated with a particular customer. In one implementation, the matching database 3104 warehouses PO files for each customer's pending and/or completed transactions. The matching database 3104 also may include a master vendor table containing a comprehensive list of vendors with whom the customer has business dealings.

The matching database 3104 may be configured to validate a transaction based on one or more of invoice data, PO data, and/or vendor data. In some cases, the matching database 3104 may verify the reliability of PO information and vendor information by performing routine comparisons of client-specific data. For example, upon receiving a new PO file, the matching database 3104 may compare the PO information to data in a vendor profile table and/or other invoice data. The matching database 3104 also may reference PO files and/or invoice associated with a customer when a new vendor is added.

In one implementation, the matching database 3104 may open an AP file pertaining to a specific transaction in response to receiving invoice data from the data transmission input device 3102. Generally, when an invoice for an ordered product is received, data is entered through the data transmission input device 3102 and sent to the matching database 3104. In response, the matching database 3104 may open an AP file, include the invoice data within the AP file, and then may attempt to validate and/or complete the AP file with matching data.

The matching database 3104 may attempt to validate the vendor information listed on the invoice based upon a comparison of invoice data in the AP file against client specific vendor profiles resident within the database. In particular, the matching database 3104 may attempt to match vendor attributes of the invoice data (e.g., vendor number, vendor name, vendor address) to a corresponding vendor profile. If an exact vendor match is found, the matching database 3104 approves the vendor. Otherwise, the matching database 3104 may indicate that the AP file is "unmatched" and identify a set of probable or near matches.

In general, the matching database 3104 may utilize software that identifies vendors that nearly match the transaction information. The matching database 3104 may provide users with multiple choices regarding match/resolution options. For instance, the matching database 3104 may enable providers and users to determine how information should be posted and/or matched. In some cases, the matching database 3104 may maintain client-specific matching rules for suggesting probable matches that fall within a specified tolerance range of an exact match. The matching database 3104 also may set rules for how to react once potential choices are found by utilizing templates to present near matching data, for example.

In one implementation, the matching database 3104 may be configured to locate specific items from a dynamic data set (e.g., client's vendor/purchase order information) that best fit a complex, multi-dimensional specification (e.g., vendor invoice data). For example, the matching database 3104 may identify a predetermined number of vendor profiles—for example, the top five vendor profiles that best match the invoice data—and include them in the AP file.

In order to reconcile unmatched AP files, the matching database 3104 may be configured to perform a manual matching process. In general, manual matching provides operators with the ability to visually inspect probable matching candidates.

In one implementation, the unmatched information is presented to a user (e.g., AP operator, client) in a split screen format. That is, invoice image data and/or the invoice image may be displayed on one portion of a GUI and near matching vendor information may be displayed on another portion of a GUI so that a user may visually compare the presented information. In this implementation, unmatched transactions (either invalid vendor data or unmatched invoices) are viewed through a split screen for one of two options: (1) supplemental data entry may occur whereby the AP file is then re-routed through the vendor validation workflow or (2) a manual match of a vendor is accomplished.

Once the vendor information has been verified, the matching database 3104 then may attempt to match the invoice data to a purchase order based upon a comparison of invoice data in the AP file against client specific PO files resident within the database. In one implementation, the matching database 3104 may attempt to match attributes of the invoice data (e.g., vendor number, invoice amount, invoice date) to one or more corresponding PO files. If no exact PO match is found, the matching database 4104 may indicate that the AP file is "unmatched" and identify a set of probable or near matches.

Again, the matching database 3104 may perform a manual matching process to reconcile the unmatched AP file. The unmatched information may be presented to a user (e.g., AP operator, client) in a split screen format. For example, the invoice image data and/or the invoice image may be displayed on one portion of a GUI and the purchase orders identified by the matching database 3104 as probable matches may be displayed on another portion of a GUI. The user may visually compare the presented information and manually select the appropriate purchase order.

Sometimes an unmatched AP file cannot be reconciled by the matching database 3104. This may the case where no near matches can be identified given the matching criteria or where the appropriate vendor or purchase order cannot be identified through manual matching. In such cases, the matching database 3104 may indicate the AP file to be "unmatched—final."

In one implementation, unmatched-final AP files may be routed to and stored by an unmatched file processor 3106. The unmatched file processor 3110 may include decision logic for handling exceptions. For instance, the unmatched file processor 3106 may implement rules for establishing who should be contacted (and how they should be reached) or what application should be alerted when a particular event occurs at a specific time. In some cases, unmatched AP files may be transferred to a designated web site to await resolution and approval. Notification tools also may be utilized to connect to personnel assigned to review and manage unmatched invoices.

In situations where the invoice data is successfully matched to appropriate vendor information and/or PO information, the matching database 3104 may indicate the AP file to be "matched." In some cases, the matching database 3104 may augment the invoice data of matched AP files with corresponding vendor and/or PO information to facilitate payment approval. In addition, in cases where a manual matching process is successful, the matching database 3104 may recognize and correct data entry errors based on the manual match. Thus, the matching database 3104 makes it possible to automatically match invoices to vendors and purchase orders and, in turn, eliminates the majority of exception processing. Matched AP files may be routed to and stored by a matched processor 3108.

In some implementations, the matched file processor 3108 may compare the matched items against automatic payment approval criteria. The automatic payment criteria may define a threshold for initiating automatic payment. If the matched items meet the criteria for automatic payment, for example, in cases where there is little doubt that payment is proper, the matched AP file may be transferred to the data transmission output device 3110.

Upon receipt of the matched AP file, the data transmission output device 3110 may initiate payment processing. For example, the data transmission output device 3110 may be configured to extract invoice and/or vendor information from the AP file and transmit the information to a billing application for presentment, review and adjudication.

In some cases, the general ledger (GL) may be updated to reflect the impact of the transaction. In one implementation, the data transmission output device 3110 may transfer details of a transaction to a GL update interface 3302 of the client system 330. The GL update interface 3302 may be implemented as an interactive GUI (e.g., Web page) and may be used to update the GL, PO files and/or vendor profiles.

In cases where automatic payment does not occur, the unmatched file processor 3106 and/or the matched file processor 3108 may present the items to the client system 330 for approval. For instance, prior to receiving approval, invoice data may be balanced against purchase order information and/or invoice exceptions may be resolved.

Typically, unmatched items will not be approved. However, there may be situations where a customer may wish to authorize payment of an unmatched invoice—such as payment to a new vendor that does not use purchase orders, for example. In some implementations, therefore, the unmatched file processor 3106 may present the unmatched items to an approval interface 3304 on the client system 330. The approval interface 3304 may be implemented as an interactive GUI, such as a Web page, for example. A user (e.g., AP operator, customer) may visually inspect the unmatched items and then grant or deny approval using the interface. If approval is denied, dispute management procedures may commence. Upon approval, the AP file may be forwarded to the data transmission output device 3110 for payment processing.

In general, approval is more likely for matched items. In one implementation, the matched file processor 3108 may classify the matching results according to vendor, date, transaction type, and/or other client-specified criteria to facilitate approval. The matched file processor 3108 then may present the information from the matched AP file to a user through the approval interface 3304 of the client system 330. The user (e.g., AP operator, customer) may visually inspect the matched items and then grant or deny approval using the interface. Upon approval, the matched file processor 3108 may forward the matched AP file to the data transmission output device 3110 for payment processing. Otherwise, dispute management procedures may commence.

Typically, the AP system 30 may be configured to report general information regarding the status of pending and completed transactions related to a particular customer. In one implementation, the AP system may include a maintenance processor 3112 configured to retrieve data from one or more sources. For example, the maintenance processor 3112 may obtain data from the matching database 3104, the unmatched file processor 3106, and/or the matched file process 3108 and present the current status of the transactions associated with a particular customer to a user (e.g., AP operator, customer). In some cases, the maintenance processor 3112 may link image data (e.g., invoice image, purchase order image) with related invoice data, purchase order data, and/or vendor data. The maintenance processor 3112 also may perform session logging and record an audit trail of user activity.

In one embodiment, the maintenance processor 3112 may aggregate the transaction information associated with a customer and present the information through a reporting interface 3306 on the client system 330. The reporting interface 3306 may be implemented as an interactive GUI, such as a Web page, for example. A user (e.g., AP operator, customer) may use the reporting interface 3306 to review and analyze current and/or historical transaction information.

In some implementations, the reporting interface 3306 may provide the ability to report information for: daily matched/assumed items, daily unmatched items, daily activity by vendor, monthly matched/assumed items, monthly unmatched items, monthly activity by vendor, monthly aged unmatched items (e.g., >5 business days), and/or other ad hoc reports. In addition, the reporting interface 3306 may support general customer service options including control of access requirements, screen layouts, report generation, and/or other user preferences.

FIGS. 10-18 illustrate aspects of one embodiment of a web site that may be presented by the AP system 30. In general, the web site may be designed to enable secure client access and support all resolution, approval, and client servicing needs. In one implementation, the web site may utilize 128 byte encryption as a security measure, require client user id and password verification, establish client/user administration profiles, identify exact and probable candidates for automatic and manual matching, and/or allow viewing of matched and unmatched items for initiating payment and performing reconciliation.

Figure 10:
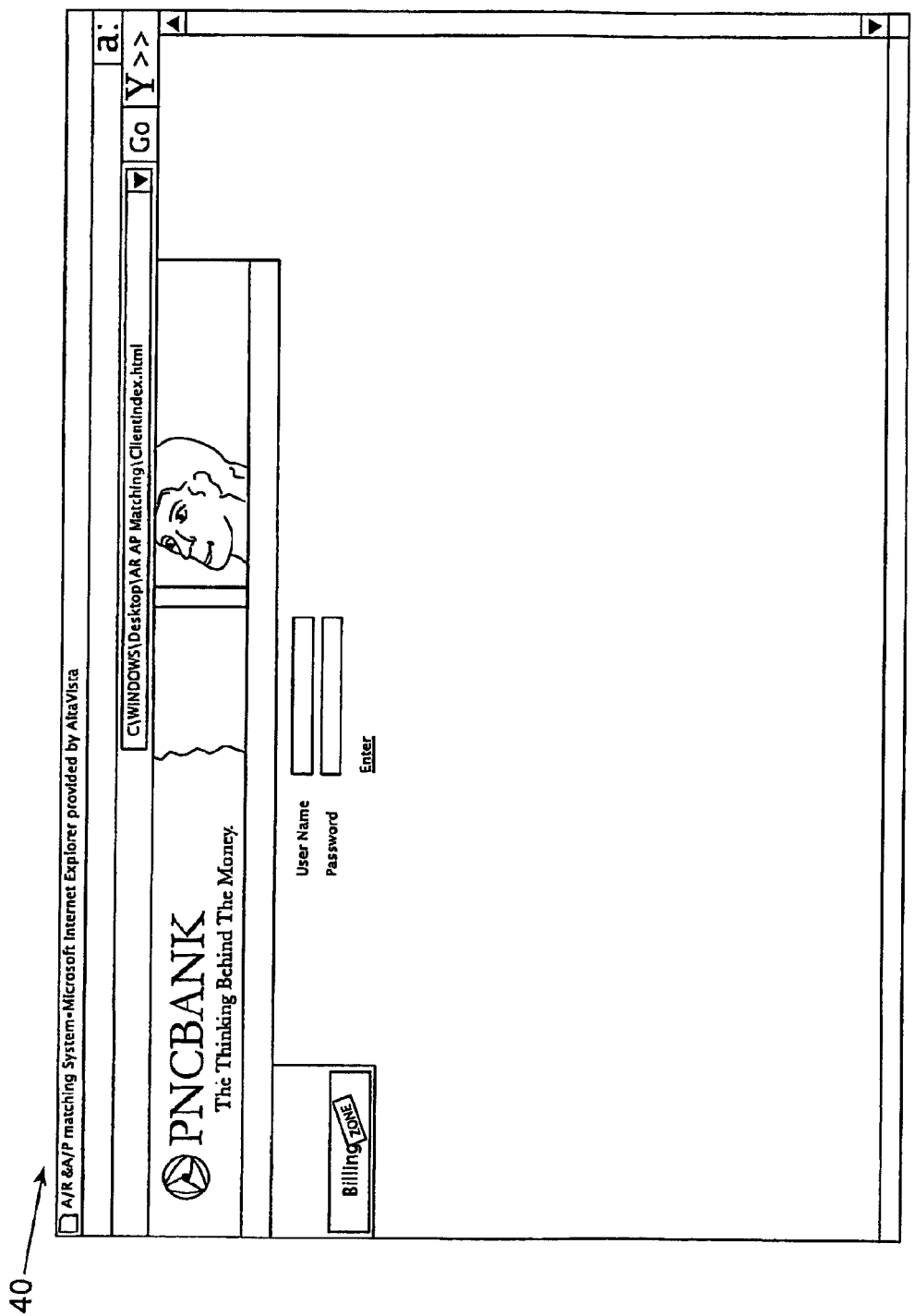

FIG. 10 illustrates one embodiment of a GUI 40 that may be presented by the AP system 30. As shown, the GUI 40 includes a log-in screen for providing secure access to client information.

Figure 11:
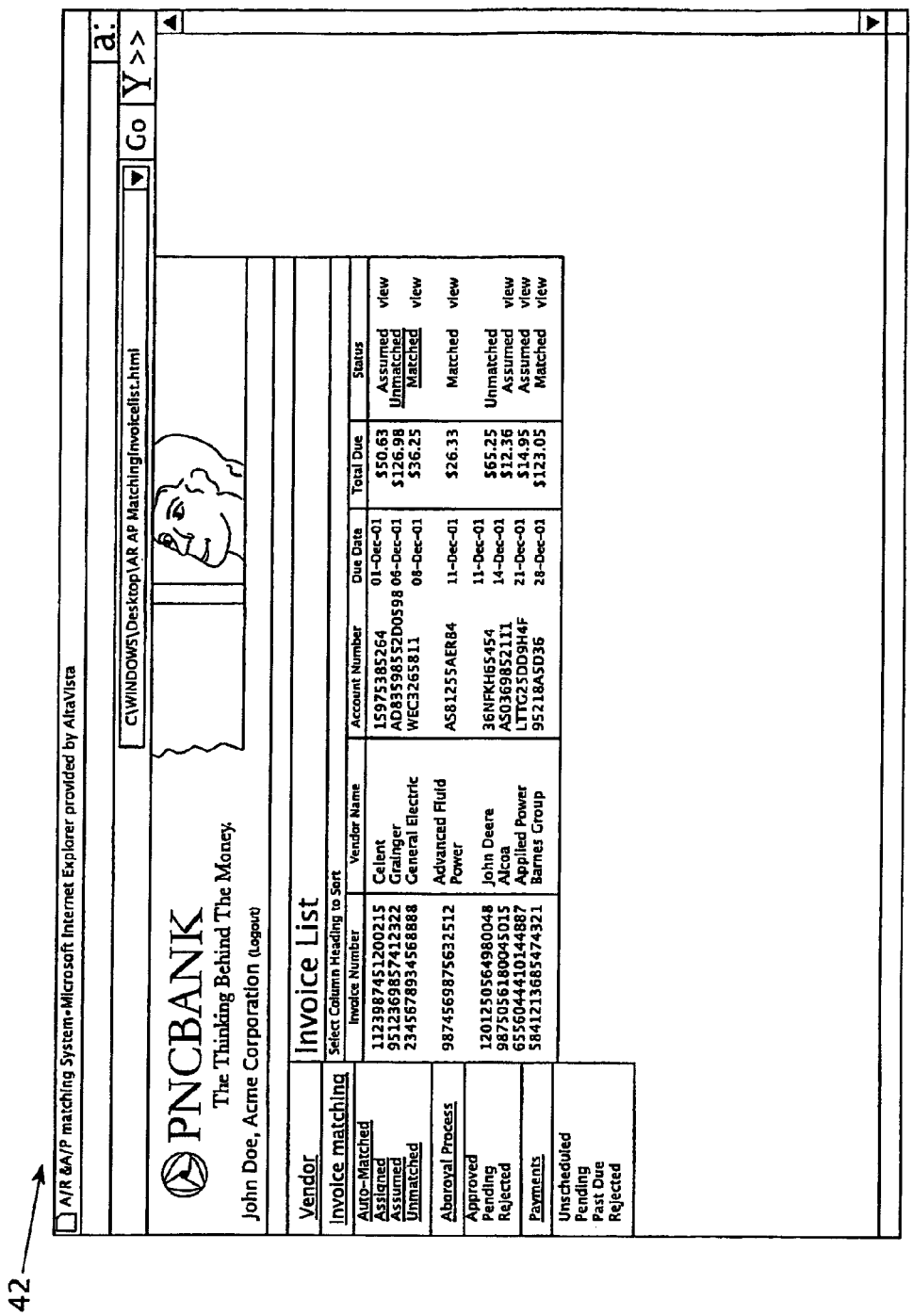

FIG. 11 illustrates one embodiment of a GUI 42 that may be presented by the AP system 30. As shown, the GUI 42 includes an invoice list identifying all invoices for a specific time period. The GUI 42 also may indicate specific purchase order status information for each transaction—that is, whether a purchase order has been matched to the invoice. In some cases, the GUI 42 may include the ability to access an image of each item.

FIG. 12 illustrates one embodiment of a GUI 44 that may be presented by the AP system 30. As shown, the GUI 44 includes a purchase order list identifying all unmatched purchase orders processed for a specific time period. The GUI 44 may provide specific purchase order information and links to potential order matches identified by a matching database. In some cases, the GUI 44 may include links to images of potential purchase order matches.

FIG. 13 illustrates one embodiment of a GUI 46 that may be presented by the AP system 30. As shown, the GUI 46 includes a purchase order match screen for viewing potential matches for a purchase order. In this implementation, the GUI 46 includes the top five invoice candidates that potentially match the purchase order. The GUI 46 may provide links to an image of potential purchase order matches and include various viewing capabilities.

FIG. 14 illustrates one embodiment of a GUI 48 that may be presented by the AP system 30. As shown, the GUI 48 includes the ability to assign specific matches to an unmatched item. The GUI 48 also provides that ability to render a purchase order to pending or rejected status.

Figure 15:
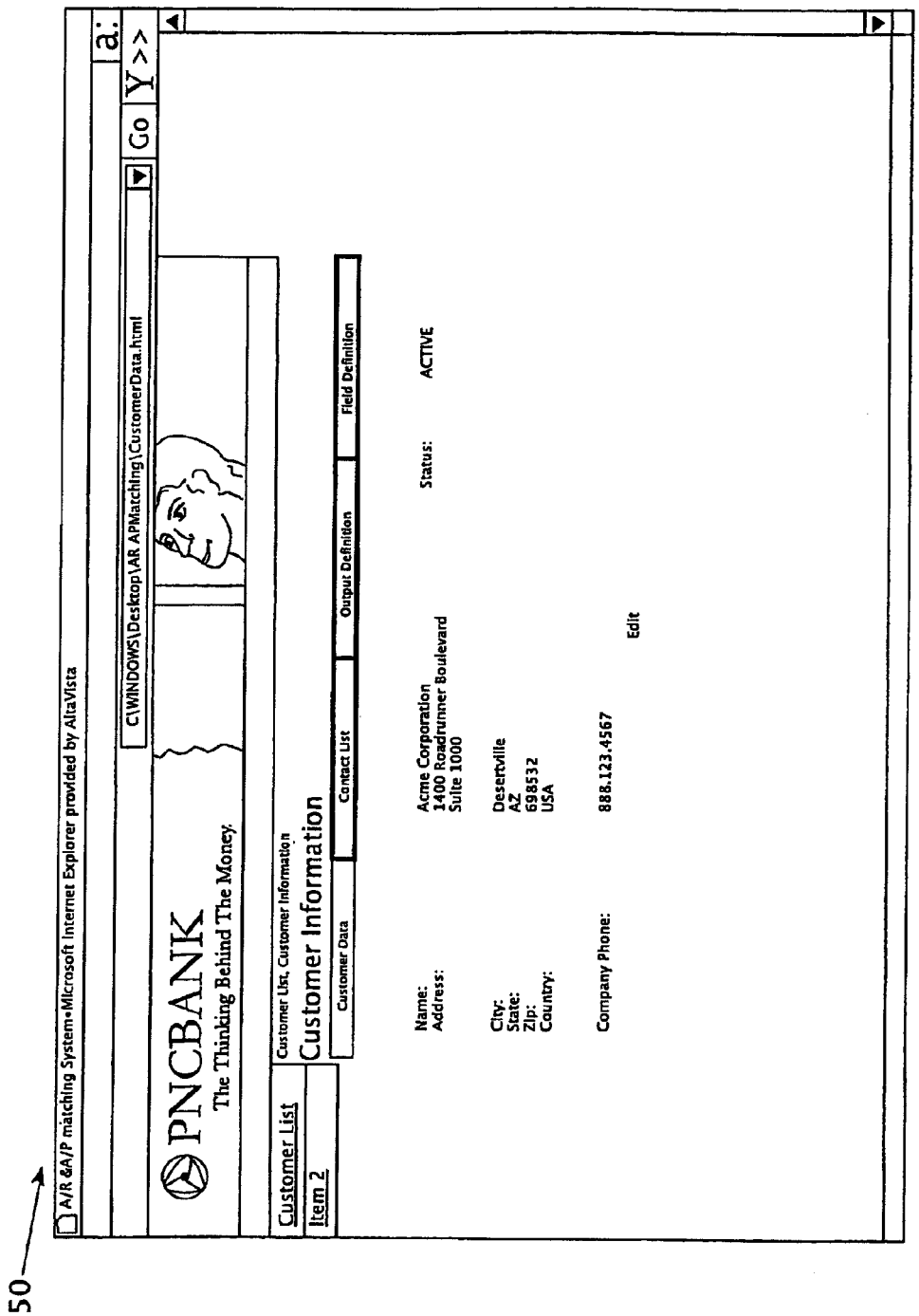

FIG. 15 illustrates one embodiment of a GUI 50 that may be presented by the AP system 30. As shown, the GUI 50 may link to a matching database for performing client or vendor profile maintenance. For example, the GUI 50 may provide the ability to change vendor name, change vendor address, change vendor number, deactivate a vendor, establish vendor PO matching thresholds, and/or adjust vendor matching criteria.

Figure 16:
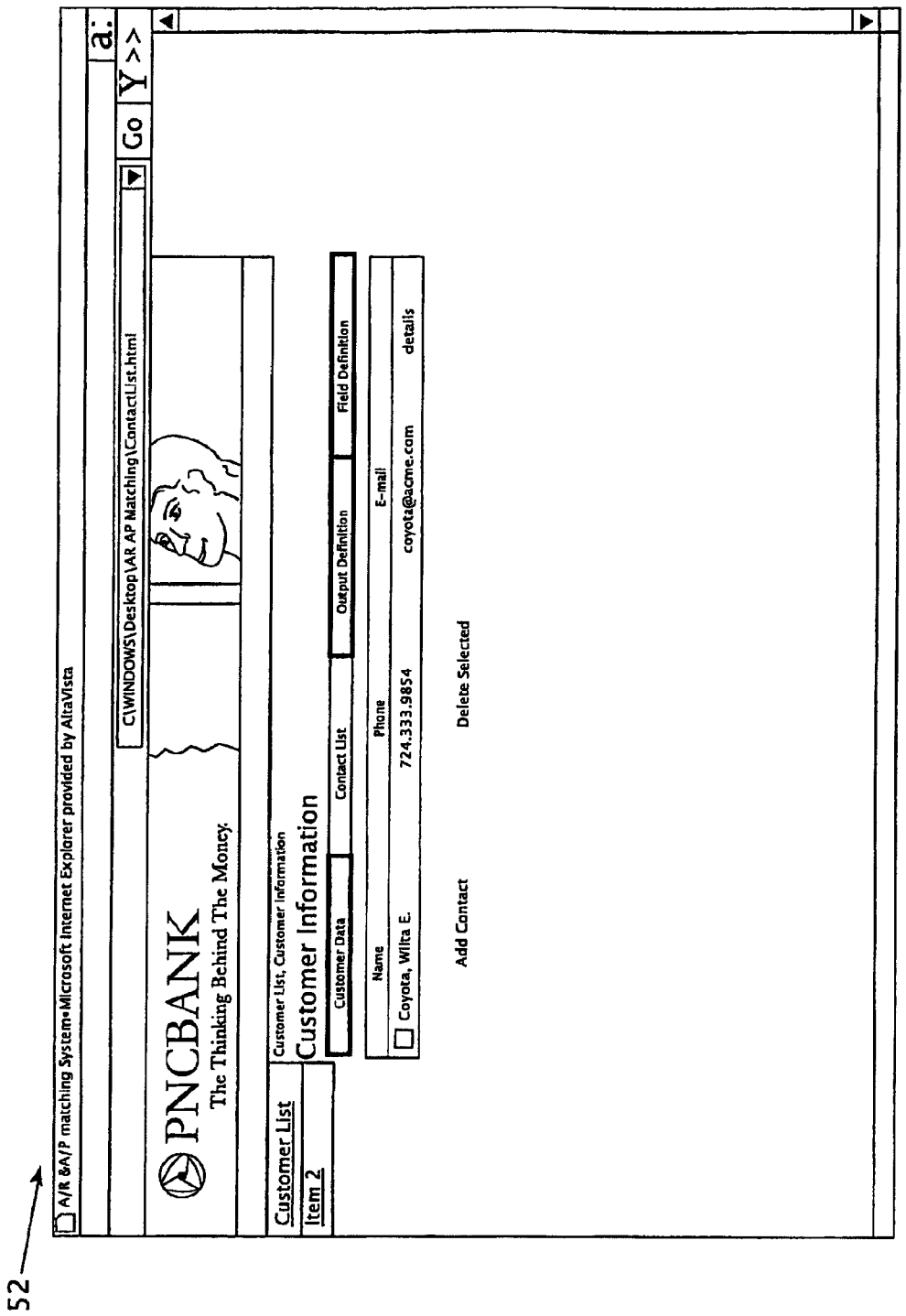

FIG. 16 illustrates one embodiment of a GUI 52 that may be presented by the AP system 30. As shown, the GUI 52 provides the ability to change a client contact name.

Figure 17:
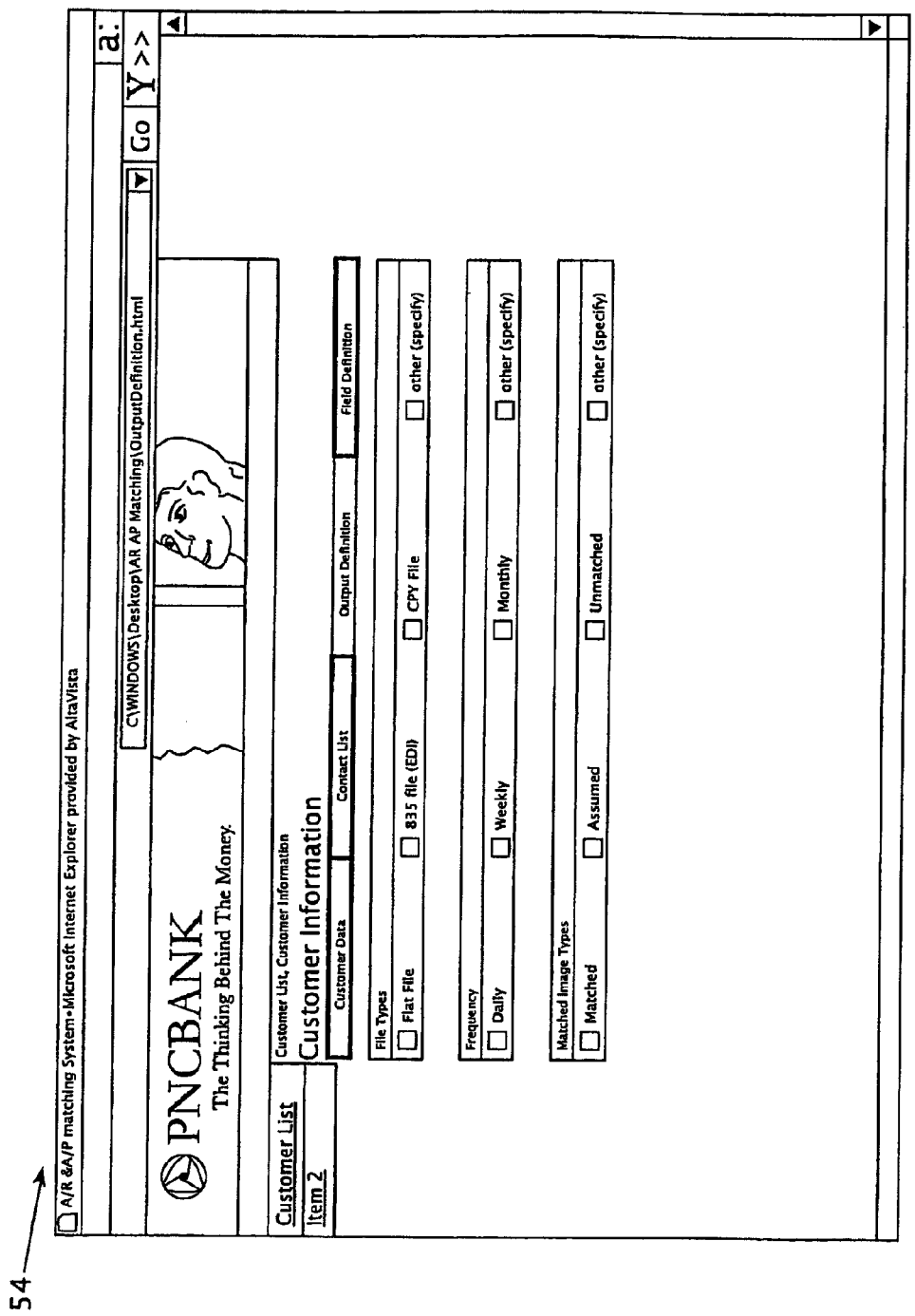

FIG. 17 illustrates one embodiment of a GUI 54 that may be presented by the AP system 30. As shown, the GUI 54 provides the ability to establish file transfer formats, frequency of file transfer and other profile parameters.

Figure 18:
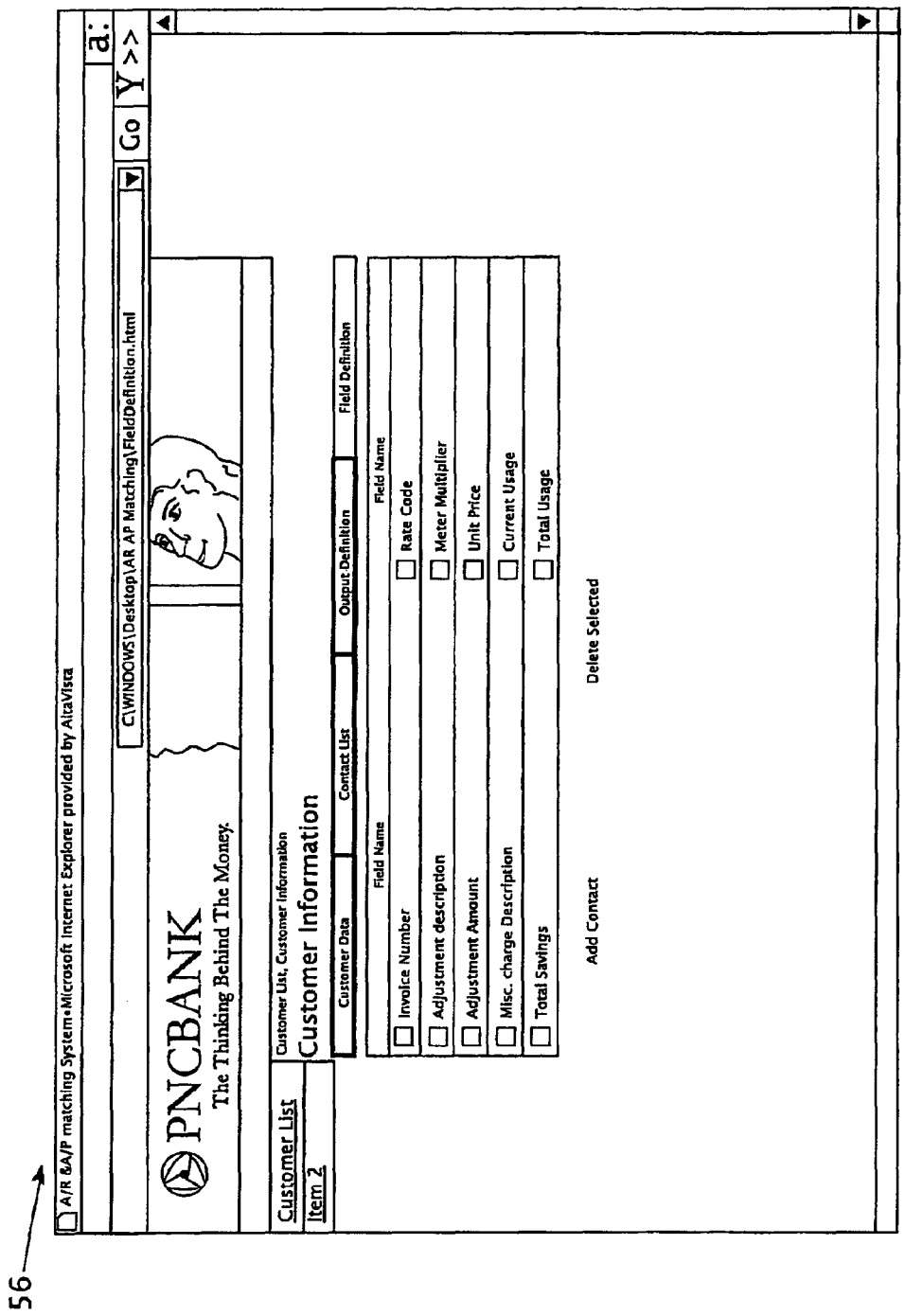

FIG. 18 illustrates one embodiment of a GUI 56 that may be presented by the AP system 30. As shown, the GUI 56 provides the ability to establish or adjust data entry requirements and data threshold levels. In this implementation, the GUI 56 includes specific vendor/invoice usage criteria.

A number of implementations have been described. Nevertheless, it will be understood that various modifications may be made and that other implementations are within the scope of the following claims.

What is claimed is:

1. An accounts payable system comprising:
a host system in communication with one or more client systems, wherein the host system comprises at least one processor and an electronic memory in communication with the at least one processor, wherein the electronic memory comprises instructions that when executed by the at least one processor cause the at least one processor to:
receive invoice data describing a first invoice and vendor data describing a plurality of vendors;
determine whether the invoice data describes a purchase order;
match a first vendor identified by the first invoice to at least one vendor described by the vendor data, wherein the matching comprises comparing a set of multi-dimensional criteria identified by the first invoice and describing the first vendor to at least one vendor described by the vendor data, wherein the matching comprises:
performing a preliminary vendor match; and
conditioned on the preliminary vendor match being unsuccessful:
identifying a set of probable vendor matches based on the set of multi-dimensional criteria; and
simultaneously presenting the set of probable vendor matches selected from the plurality of vendors described by the vendor data on a graphical user interface;
retrieve a vendor profile from the vendor data, wherein the vendor profile describes the first vendor;
when the invoice data does not describe a purchase order and the vendor profile indicates that the vendor does not use purchase orders, match the first invoice to at least one recurring invoice type, wherein the matching the first invoice comprises comparing a second set of multi-dimensional criteria describing the at least one recurring invoice type to the first invoice, wherein the second set of multidimensional criteria comprise a range of receipt dates, an originating vendor, a product, and an invoice amount; and
conditioned upon successfully matching the first vendor to the at least one vendor and upon successfully matching the first invoice to the at least one recurring invoice type, transmit payment of the invoice to the first vendor.

2. The accounts payable system of claim 1, wherein the host system is accessible by at least one client system across a network.

3. The accounts payable system of claim 2, wherein the network comprises a wireless communications network.

4. The accounts payable system of claim 2, wherein the network comprises at least one of the Internet and World Wide Web.

5. The accounts payable system of claim 1, wherein the matching database stores the invoice data and the vendor data for a customer.

6. The accounts payable system of claim 1, wherein the invoice data and the vendor data are associated with a particular customer.

7. The accounts payable system of claim 1, wherein the matching database is configured to perform matching according to client-specific matching rules.

8. The accounts payable system of claim 1, wherein the matching database is configured to communicate probable matches to at least one client system.

9. The accounts payable system of claim 8, wherein the matching database is configured to allow the client system to manually select at least one probable match.

10. The accounts payable system of claim 1, further comprising a data transmission input device configured to communicate transaction information to the matching database.

11. The accounts payable system of claim 1, further comprising an unmatched processor configured to receive accounts payable files that are not successfully matched to at least one of the at least one vendor described by the vendor data and the at least one recurring invoice type.

12. The accounts payable system of claim 1, further comprising a matched file processor configured to receive and process accounts payable files that are successfully matched to at least one of the at least one vendor described by the vendor data and the at least one recurring invoice type.

13. A tangible computer readable medium comprising instructions that when executed by at least one processor cause the at least one processor to:
receive invoice data describing a first invoice and vendor data describing a plurality of vendors;
determine whether the invoice data describes a purchase order;
match a first vendor identified by the first invoice to at least one vendor described by the vendor data, wherein the matching comprises comparing a set of multi-dimensional criteria identified by the first invoice and describing the first vendor to at least one vendor described by the vendor data, wherein the matching comprises:
performing a preliminary vendor match; and
conditioned on the preliminary vendor match being unsuccessful:
identifying a set of probable vendor matches based on the set of multi-dimensional criteria; and
simultaneously presenting the set of probable vendor matches selected from the plurality of vendors described by the vendor data on a graphical user interface;
retrieve a vendor profile from the vendor data, wherein the vendor profile describes the first vendor;
when the invoice data does not describe a purchase order and the vendor profile indicates that the vendor does not use purchase orders, match the first invoice to at least one recurring invoice type, wherein the matching the first invoice comprises comparing a second set of multi-dimensional criteria describing the at least one recurring invoice type to the first invoice, wherein the second set of multi-dimensional criteria comprise a range of receipt dates, an originating vendor, a product, and an invoice amount; and
conditioned upon successfully matching the first vendor to the at least one vendor and upon successfully matching the first invoice to at least one recurring invoice type, transmit payment of the invoice to the first vendor.

14. The computer readable medium of claim 13, wherein the computer-readable medium comprises at least one of a disk and a device.

15. The computer readable medium of claim 14, further comprising instructions that when executed by at least one processor cause the at least one processor to initiate the electronic scanning of a paper invoice document.

16. The computer readable medium of claim 13, further comprising instructions that when executed by at least one processor cause the at least one processor to initiate the electronic scanning of a paper invoice document.

17. An accounts payable system comprising:

means for receiving invoice data describing a first invoice and vendor data describing a plurality of vendors;

means for determining whether the invoice data describes a purchase order;

means for matching a first vendor identified by the first invoice to at least one vendor described by the vendor data, wherein the matching comprises comparing a set of multi-dimensional criteria identified by the first invoice and describing the first vendor to at least one vendor described by the vendor data, wherein the matching comprises:

performing a preliminary vendor match; and conditioned on the preliminary vendor match being unsuccessful:

identifying a set of probable vendor matches based on the set of multi-dimensional criteria; and simultaneously presenting the set of probable vendor matches selected from the plurality of vendors described by the vendor data on a graphical user interface;

means for retrieving a vendor profile from the vendor data, wherein the vendor profile describes the first vendor;

means for matching the first invoice to at least one recurring invoice type when the invoice data does not describe a purchase order and the vendor profile indicates that the vendor does not use purchase orders, wherein the matching the first invoice comprises comparing a second set of multi-dimensional criteria describing the at least one recurring invoice type to the first invoice, wherein the second set of multi-dimensional criteria comprise a range of receipt dates, an originating vendor, a product, and an invoice amount; and means for transmitting payment of the invoice to the first vendor, wherein the transmitting is conditioned upon successfully matching the first vendor to the at least one vendor and upon successfully matching the first invoice to at least one recurring invoice type.

* * * * *